(12) United States Patent
Takahashi et al.

(10) Patent No.: US 7,058,543 B2
(45) Date of Patent: Jun. 6, 2006

(54) EVALUATION APPARATUS AND EVALUATION METHOD

(75) Inventors: Masamichi Takahashi, Kanagawa (JP);
Masakazu Fujimoto, Kanagawa (JP);
Nobuhiro Yamasaki, Kanagawa (JP);
Hiroyuki Hattori, Kanagawa (JP);
Hiroko Onuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 61 days.

(21) Appl. No.: 10/762,475

(22) Filed: Jan. 23, 2004

(65) Prior Publication Data

US 2004/0210422 A1 Oct. 21, 2004

(30) Foreign Application Priority Data

Jan. 27, 2003 (JP) ............................ 2003-017019
Sep. 12, 2003 (JP) ............................ 2003-320521

(51) Int. Cl.
*G06F 17/60* (2006.01)
(52) U.S. Cl. ...................................... 702/183; 709/206
(58) Field of Classification Search ................ 702/182, 702/187, 189; 707/1, 100, 101, 102, 200, 707/201, 203
See application file for complete search history.

(56) References Cited

U.S. PATENT DOCUMENTS

| | | | | |
|---|---|---|---|---|
| 4,318,184 A | * | 3/1982 | Millett et al. | 707/1 |
| 4,763,277 A | * | 8/1988 | Ashford et al. | 706/47 |
| 6,029,192 A | * | 2/2000 | Hill et al. | 709/206 |
| 6,098,078 A | * | 8/2000 | Gehani et al. | 707/203 |
| 6,122,632 A | * | 9/2000 | Botts et al. | 707/10 |
| 6,945,458 B1 | * | 9/2005 | Shah et al. | 235/385 |
| 2002/0107859 A1 | * | 8/2002 | Tsuyuki | 707/100 |
| 2002/0156854 A1 | * | 10/2002 | Matsumoto | 709/206 |
| 2002/0169835 A1 | * | 11/2002 | Paul et al. | 709/206 |
| 2003/0009448 A1 | * | 1/2003 | Covington et al. | 707/3 |
| 2003/0018727 A1 | * | 1/2003 | Yamamoto | 709/206 |
| 2003/0037116 A1 | * | 2/2003 | Nolan et al. | 709/206 |
| 2003/0065681 A1 | * | 4/2003 | Houston et al. | 707/200 |
| 2003/0158905 A1 | * | 8/2003 | Petry et al. | 709/206 |
| 2003/0182379 A1 | * | 9/2003 | Henry | 709/206 |
| 2004/0034668 A1 | * | 2/2004 | Gotz et al. | 707/201 |

(Continued)

FOREIGN PATENT DOCUMENTS

JP  A 6-59993  3/1994

(Continued)

OTHER PUBLICATIONS

U.S. Appl. No. 60/399,345.*

(Continued)

*Primary Examiner*—Carol S. W. Tsai
(74) *Attorney, Agent, or Firm*—Oliff & Berridge, PLC

(57) ABSTRACT

An analysis and evaluation apparatus analyzes, for organizations and individuals, the communication content of email, and extracts common words for each organization. The analysis and evaluation apparatus compares common words and concepts for an organization or an individual that is to be evaluated, with common words and concepts for other organizations, and performs an evaluation to determine how they influence the other organizations. Thereafter, the analysis and evaluation apparatus analyzes the usage level whereat the other organizations utilize the organization or individual to be evaluated. And then, based on the usage level and the number of organizations that are influenced by the organization or the individual to be evaluated, the analysis and evaluation apparatus evaluates and ascertains the value of the organization or individual to be evaluated, and analyzes and stores a time-transient change as to how others are influenced.

18 Claims, 24 Drawing Sheets

U.S. PATENT DOCUMENTS

2004/0088286 A1* 5/2004 Hackleman et al. ............ 707/3

FOREIGN PATENT DOCUMENTS

| JP | A 6-62046 | 3/1994 |
| --- | --- | --- |
| JP | A 6-259345 | 9/1994 |
| JP | A 10-301905 | 11/1998 |
| JP | A 11-15757 | 1/1999 |
| JP | A 11-242545 | 9/1999 |
| JP | A 2003-85347 | 3/2003 |

OTHER PUBLICATIONS

Batagelj et al., "Pajek: Program for Analysis and Visulation of Large Networks," Reference Manual, List of Commands with Short Explanation, Version 1.00, pp. 1-72, Jan. 27, 2004.

Takahashi et al., "The Active Lurker: Influence of an In-House Online Community on Its Outside Environment," Academic Conference, 10 pages, Nov. 2003.

* cited by examiner

CLIENT COMPUTER 20,
SERVER 24,
ANALYSIS AND EVALUATION APPARATUS 3

FIG. 5

| COMMUNICATION ID | SENDER ID | RECIPIENT ID | COMMUNICATION CONTENTS | COMMUNICATION DATE AND TIME |

FIG. 6

| COMMUNICATION ID | SENDER ID | RECIPIENT ID | COMMUNICATION CONTENTS | DATE AND TIME |
|---|---|---|---|---|
| 1 | 1 | 2 | SHOULD REVIEW THE RESULTS OF A DISCUSSION CONCERNING WHETHER PRODUCTS A, B AND E CAN BE PREPARED IN TIME FOR THE DELIVERY DEADLINE. | 10:00, AUGUST 5, 2001 |
| 2 | 1 | 3 | PLEASE SET UP A MEETING FOR PRODUCT A FOR 19:00 TODAY. | 11:00, AUGUST 5, 2001 |
| 3 | 1 | 4 | BETTER HAVE MORE INTENSIVE DISCUSSION OF PRODUCT E LATER. | 8:00, AUGUST 6, 2001 |
| 4 | 2 | 3 | WHEN IS THE DEADLINE FOR THE DELIVERY OF PRODUCT B? | 14:00, AUGUST 5, 2001 |
| 5 | 3 | 1 | THE DEADLINE OF THE DELIVERY OF PRODUCT A DEPENDS ON THE PRODUCTIVITY WHEN TECHNIQUE 1 IS USED. HERE IS REFERENCE MATERIAL RELATED TO TECHNIQUE 1. | 15:00, AUGUST 5, 2001 |
| 6 | 3 | 2 | THE DEADLINE FOR THE DELIVERY OF PRODUCT B IS NOVEMBER. | 9:00, AUGUST 6, 2001 |
| 7 | 4 | 1 | THE PACKAGE DESIGNS FOR PRODUCTS A AND B ARE GREATLY DELAYED, ··· | 14:00, AUGUST 5, 2001 |
| 8 | 4 | 3 | THE PACKAGE DESIGN FOR PRODUCT A WILL BE DELAYED. SO TODAY, PLEASE SUBMIT A REPORT ON TECHNIQUE 1 TO OUR PRESIDENT. | 16:00, AUGUST 5, 2001 |
| ... | ... | ... | ... | ... |
| ... | ... | ... | ... | ... |

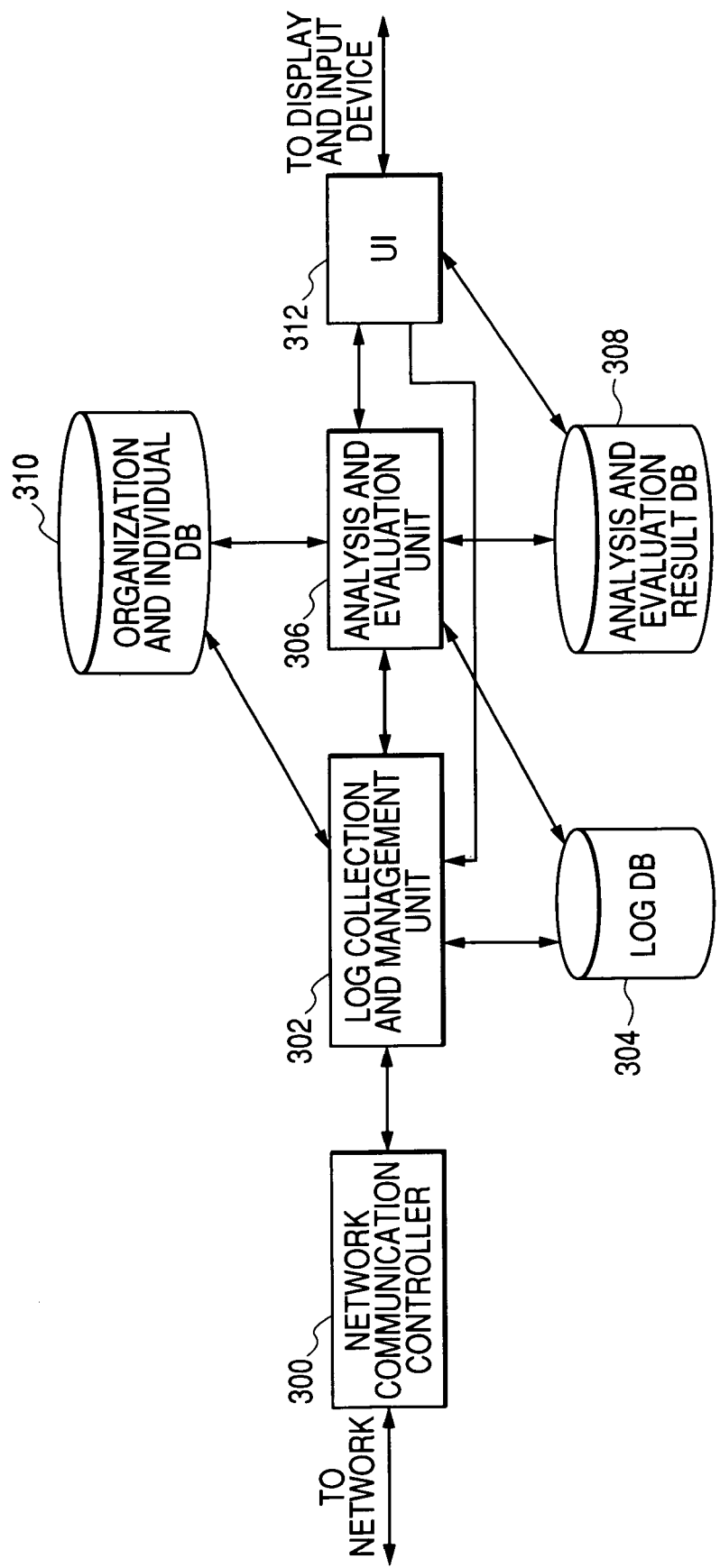

FIG. 8

| ORGANIZATION ID | ORGANIZATION NAME | ORGANIZATION FORM | PERIOD | UPPER ORGANIZATION |
|---|---|---|---|---|

FIG. 9

| ORGANIZATION ID | ORGANIZATION NAME | ORGANIZATION FORM | PERIOD | UPPER ORGANIZATION |
|---|---|---|---|---|
| 1 | PRESIDENT'S OFFICE | FORMAL | JULY 4, 1992 TO THE PRESENT | - |
| 2 | B | FORMAL | JULY 4, 1992 TO THE PRESENT | 1 |
| 3 | C | INFORMAL | OCTOBER 24, 2001 TO THE PRESENT | 2 |
| 4 | D | PROJECT | MAY 17, 2003 TO JUNE 2, 2003 | 3 |
| ... | ... | ... | ... | ... |
| 100 | AA | FORMAL | DECEMBER 23, 2002 TO MARCH 31, 2003 | 29 |
| 101 | AB | INFORMAL | JANUARY 7, 2003 TO MARCH 31, 2003 | 100 |
| ... | ... | ... | ... | ... |

FIG. 10

| PERSONAL ID (EMPLOYEE ID) | NAME | EMAIL ADDRESS | ORGANIZATION ID |
|---|---|---|---|

FIG. 11

| EMPLOYEE ID | NAME | EMAIL ADDRESS | ORGANIZATION ID |
|---|---|---|---|
| 1 | Hoge1 | Hoge1@a.b.c | 1 |
| 2 | Hoge2 | Hoge2@a.b.c | 2, 3 |
| 3 | Hoge3 | Hoge3@a.b.c | 5, 8, 10 |
| 4 | Hoge4 | Hoge4@a.b.c | 5, 8, 10 |
| ... | ... | ... | ... |
| 127 | Hoge127 | Hoge127@a.b.c | 3, 50, 75, 99, 120 |
| ... | ... | ... | ... |

FIG. 12

| ORGANIZATION COMMUNICATION ID | SENDER ID | RECIPIENT ID | SENDER ORGANIZATION ID | RECIPIENT ORGANIZATION ID | COMMUNICATION CONTENTS | COMMUNICATION DATE AND TIME |
| --- | --- | --- | --- | --- | --- | --- |

FIG. 13

| COMMU-NICATION ID | SENDER ID | RECIPIENT ID | SENDER ORGANI-ZATION ID | RECIPIENT ORGANI-ZATION ID | COMMUNICATION CONTENTS | DATE AND TIME |
|---|---|---|---|---|---|---|
| 1 | 1 | 2 | 1 | 5, 8, 10 | SHOULD REVIEW THE RESULTS OF A DISCUSSION CONCERNING WHETHER PRODUCTS A, B AND E CAN BE PREPARED IN TIME FOR THE DELIVERY DEADLINE. | 10:00, AUGUST 5, 2001 |
| 2 | 1 | 3 | 1 | 5, 8, 10 | PLEASE SET UP A MEETING FOR PRODUCT A FOR 19:00 TODAY. | 11:00, AUGUST 5, 2001 |
| 3 | 1 | 4 | 1 | 5, 8, 10 | BETTER HAVE MORE INTENSIVE DISCUSSION OF PRODUCT E LATER. | 8:00, AUGUST 6, 2001 |
| 4 | 2 | 3 | 2, 3 | 5, 8, 10 | WHEN IS THE DEADLINE FOR THE DELIVERY OF PRODUCT B? | 14:00, AUGUST 5, 2001 |
| 5 | 3 | 1 | 5, 8, 10 | 1 | THE DEADLINE OF THE DELIVERY OF PRODUCT A DEPENDS ON THE PRODUCTIVITY WHEN TECHNIQUE 1 IS USED. HERE IS REFERENCE MATERIAL RELATED TO TECHNIQUE 1. | 15:00, AUGUST 5, 2001 |
| 6 | 3 | 2 | 5, 8, 10 | 2, 3 | THE DEADLINE FOR THE DELIVERY OF PRODUCT B IS NOVEMBER. | 9:00, AUGUST 6, 2001 |
| 7 | 4 | 1 | 5, 8, 10 | 1 | THE PACKAGE DESIGNS FOR PRODUCTS A AND B ARE GREATLY DELAYED, ··· | 14:00, AUGUST 5, 2001 |
| 8 | 4 | 3 | 5, 8, 10 | 5, 8, 10 | THE PACKAGE DESIGN FOR PRODUCT A WILL BE DELAYED. SO TODAY, PLEASE SUBMIT A REPORT ON TECHNIQUE 1 TO OUR PRESIDENT. | 16:00, AUGUST 5, 2001 |
| ... | ... | ... | ... | ... | ... | ... |
| ... | ... | ... | ... | ... | ... | ... |

FIG. 18A
COMMON WORD FOR ORGANIZATION A

| COMMON WORD | APPEARANCE FREQUENCY |
|---|---|
| CLIENT | 48 |
| WOMAN | 42 |
| DISCUSSION | 40 |
| STRATEGY | 39 |
| TECHNIQUE | 30 |
| CUSTOMER | 29 |
| BUSINESS | 25 |
| SITE | 5 |

FIG. 18B
COMMON WORD FOR ORGANIZATION B

| COMMON WORD | APPEARANCE FREQUENCY |
|---|---|
| SITE | 52 |
| REQUEST | 48 |
| SERVER | 40 |
| EVERYBODY | 40 |
| IDEA | 40 |
| DISCUSSION | 32 |
| TECHNIQUE | 30 |
| COST | 3 |

FIG. 18C
COMMON WORD FOR ORGANIZATION C

| COMMON WORD | APPEARANCE FREQUENCY |
|---|---|
| YEN | 108 |
| ROBOT | 94 |
| TECHNIQUE | 93 |
| DISCUSSION | 78 |
| PRINT | 68 |
| COST | 64 |
| PRODUCTION | 54 |
| SERVER | 10 |

FIG. 19

| ORGANIZATION ID | COMMON WORD | CONCEPT |
|---|---|---|
| | | |

FIG. 20

| ORGANIZATION ID | COMMON SYNONYM | |
|---|---|---|
| 1 | COMMON SYNONYM | APPEARANCE FREQUENCY |
| | {CLIENTELE, CUSTOMER, CLIENT} | 100 |
| | {ACTIVITY, ACTION, JOB, TASK, ···} | 78 |
| | {SOLUTION, RESOLVING METHOD, ANSWER, ···} | 32 |
| 2 | COMMON SYNONYM | APPEARANCE FREQUENCY |
| | {UNDERSTANDING, KNOWLEDGE, SENSE, EXPERIENCE} | 32 |
| | {TECHNIQUE, TECHNOLOGY, FUNCTION} | 14 |
| | ··· | 7 |
| 3 | COMMON SYNONYM | APPEARANCE FREQUENCY |
| | ··· | 98 |
| | ··· | 20 |
| | ··· | 3 |

FIG. 21

| SENDER ORGANIZATION ID | RECIPIENT ORGANIZATION ID | COMMON WORD |
|---|---|---|

FIG. 22

| SENDER ORGANIZATION ID | RECIPIENT ORGANIZATION ID | COMMON WORD |
|---|---|---|
| 1 | 2 | {CLIENT, SATISFACTION, RELIABILITY} |
| 1 | 5 | {CLIENT, COMPETITION, COOPERATION} |
| 2 | 1 | {SERVICE, SOLUTION, ···} |
| 2 | 4 | {···, ···, ···} |
| 3 | 1 | {···, ···, ···} |
| 3 | 5 | {···, ···, ···} |

FIG. 23

| SENDER ORGANIZATION ID | RECIPIENT ORGANIZATION ID | COMMON WORD | CONCEPT |
|---|---|---|---|

FIG. 25

| SENDER ORGANIZATION ID | RECIPIENT ORGANIZATION ID | COMMON WORD |
|---|---|---|

FIG. 26

| SENDER ORGANIZATION ID | RECIPIENT ORGANIZATION ID | COMMON WORD | CONCEPT |
|---|---|---|---|

FIG. 27

| ORGANIZATION ID (PERSONAL ID) | COMMON WORD | AFFECT RANGE (ORGANIZATION COUNT) |
|---|---|---|

FIG. 28

| ORGANIZATION ID | AFFECT RANGE (ORGANIZATION COUNT) |
|---|---|
| 1 | 115 |
| 2 | 32 |
| 3 | 50 |
| 4 | 40 |

FIG. 29

| ORGANIZATION ID | AFFECT LEVEL (FREQUENCY) |
|---|---|
| 1 | 753 |
| 2 | 222 |
| 3 | 300 |
| 4 | 50 |

FIG. 30

| ORGANIZATION ID (PERSONAL ID) | COMMON WORD | CONCEPT | AFFECT RANGE (ORGANIZATION COUNT) |
|---|---|---|---|

FIG. 33

| ORGANIZATION ID | CONCEPT (WORD) | AFFECT RANGE (ORGANIZATION COUNT) |
|---|---|---|
| 1 | CLIENT | 50 |
| 1 | SATISFACTION | 50 |
| 1 | RELIABILITY | 15 |
| 2 | SERVICE | 12 |
| 2 | SOLUTION | 20 |
| 3 | KNOWLEDGE | 50 |
| 4 | TECHNIQUE | 10 |
| 4 | COMPETITION | 20 |
| 4 | ENVIRONMENT | 10 |

FIG. 34

| ORGANIZATION ID | CONCEPT (WORD) | AFFECT LEVEL (FREQUENCY) |
|---|---|---|
| 1 | CLIENT | 500 |
| 1 | SATISFACTION | 200 |
| 1 | RELIABILITY | 53 |
| 2 | SERVICE | 121 |
| 2 | SOLUTION | 101 |
| 3 | KNOWLEDGE | 300 |
| 4 | TECHNIQUE | 10 |
| 4 | COMPETITION | 20 |
| 4 | ENVIRONMENT | 20 |

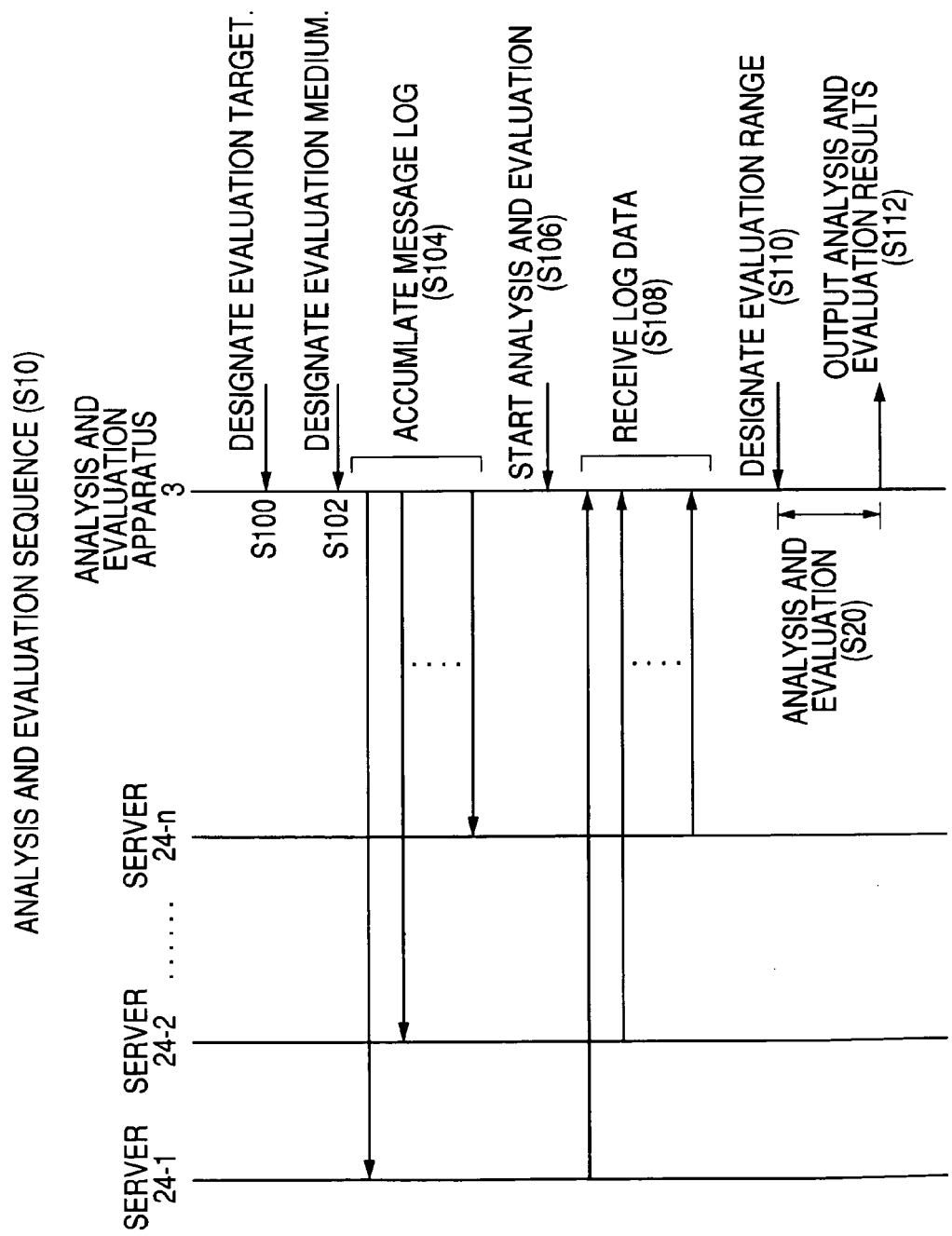

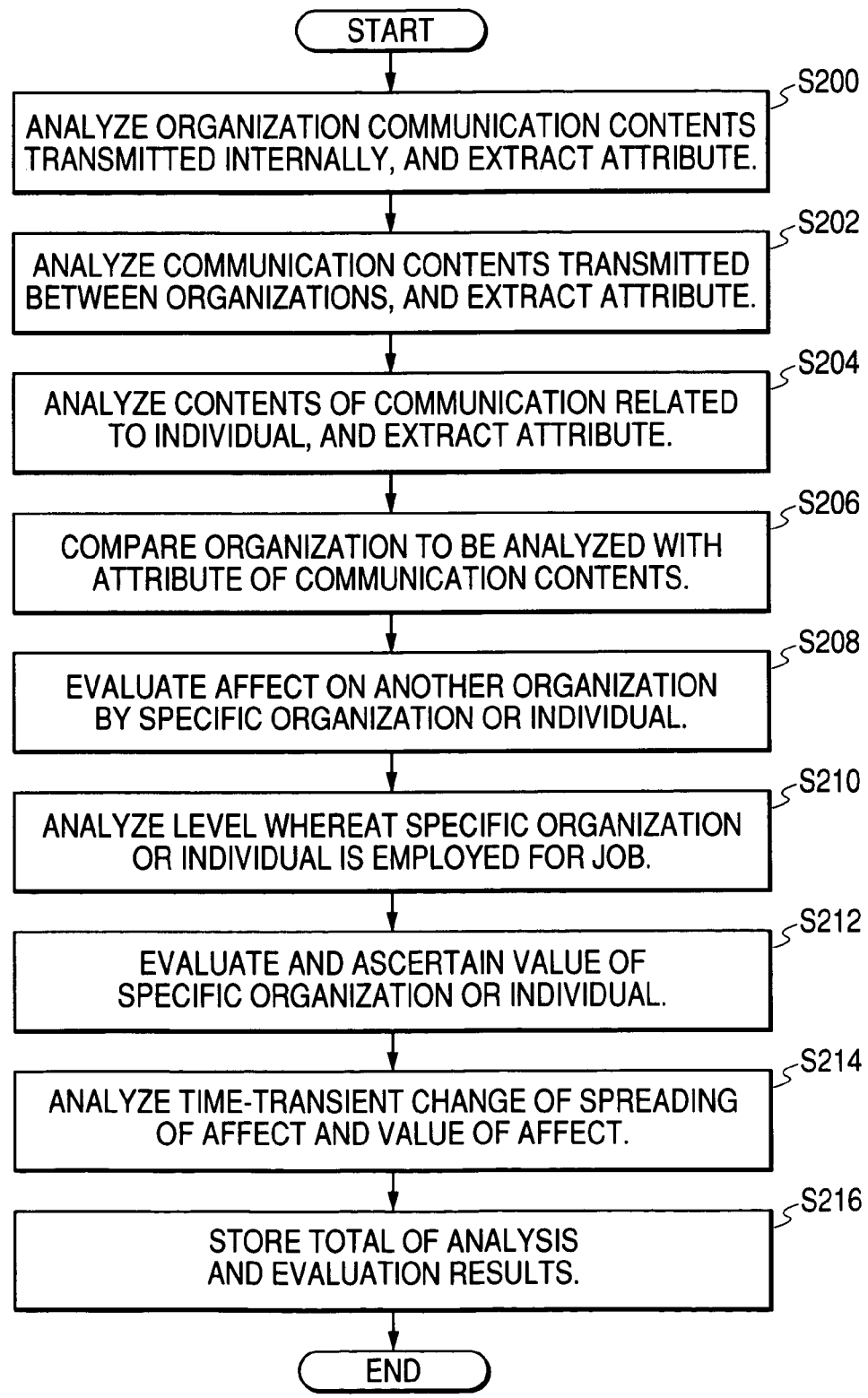

EVALUATION APPARATUS AND EVALUATION METHOD

BACKGROUND OF THE INVENTION

1. Field of the Invention

The present invention relates to an evaluation apparatus and an evaluation method for evaluating, based on research results obtained for information propagated among a plurality of organizations, how one organization has influenced another organization.

2. Description of the Related Art

Nowadays, emails, mailing lists for email systems, and electronic bulletin board systems using the WWW (World Wide Web) are commonly used as organizational communication (organizational communication) means that employ an information technology (IT).

Since messages to be by these organizational communication means are stored in message logs, these messages can be analyzed, as needed, and the analyzed results can be used.

For an email that is propagated as a message using an organizational communication means, included in a message log is a header, which includes data such as a title, a poster and a date, and message text. In JP-A-11-242545, for example, a system based on a natural language is disclosed that searches a message log for such data.

As another example, in JP-A-6-059993 a method is disclosed whereby data included in a header are used for network management (the analysis of a routing delay, and the storage of a log).

As an additional example, in JP-A-6-259345, in JP-A-11-015757, and in JP-A-6-062046, a method is disclosed whereby data included in a header are used for an agent process (the sorting of emails) performed on a reception side.

However, the objectives of the system and the methods disclosed in these documents are not designed to provide for an evaluation, using accumulated message logs, of the extent to which one organization influences others.

Therefore, by using any of the systems and the methods, it is not possible to objectively perform an evaluation (a value evaluation) to determine how a specific organization influences other organizations or the data provided for the other organizations, and to obtain a value for the specific organization.

On the other hand, there is proposed a method for analyzing a message log from the viewpoint of organizational communication means, and the usefulness of the message is discussed academically (see documents: "Advances in social network analysis: Research in the social and behavioral sciences, pp. 167–203, Newbury Park, Calif.: Sage, 1996 ACM 0-89791-782-0/96/04, JCMC 3(4) June 1998"; and "Work group structures and computer support: A field experiment, pp. 324–343, Portland, Oreg., United States, 1988 ACM 0-89791-282-9/88/0324").

However, the method proposed in the above documents is not a method to be used for analyzing a message log, and for evaluating the obtained results as the value of a specific organization, such as a company, among a set of organizations. Further, for the analysis, a method is not disclosed for automatically performing the process proceeding from the acquisition of a message log, produced from organizational communications, and continuing until an analysis of the message log has been completed.

In addition, there is known a method for analyzing a message log that has been obtained as the result of organizational communication means, and of visualizing information representing relationships among posters (see document: "Takahashi, Kitayama and Kaneko: Weighing and visualizing organization awareness in network communications, Bulletin of Information Processing Institute, Vol. 40, No. 11, pp. 3988–3999, November 1999").

Further, in JP-A-10-301905, a method is disclosed for analyzing a message log in order to use relationship information in common.

Furthermore, there is known a method for employing relationship information to calculate various indicators including an indicator for visualization.

However, according to the methods disclosed in the above documents, merely organizational communications are visualized, and an evaluation of the value of an organization is not performed.

Therefore, by using any of the methods disclosed in these documents, an evaluation of the value of an organization cannot be objectively performed.

SUMMARY OF THE INVENTION

The present invention has been made to provide an evaluation apparatus and an evaluation method for analyzing the research results for messages propagated within an organization and between organizations, and for objectively evaluating the values obtained for the organizations.

In order to achieve the object, according to a first aspect of the invention, there is provided an evaluation apparatus including: a propagation information storage unit configured to store propagation information data including information to be propagated within a plurality of groups to be evaluated; and an evaluation unit configured to evaluate an influence that one group, which is selected from among the plurality of groups, has on other group by analyzing the propagation information data stored in the propagation information storage unit.

According to a second aspect of the invention, there is provided an evaluation method including: storing propagation information data including information to be propagated within a plurality of groups to be evaluated; and evaluating an influence that one group, which is selected from among the plurality of groups, has on other group by analyzing the propagation information data stored.

According to a third aspect of the invention, there is provided a program for computer to evaluate activities of a plurality of groups to be evaluated, the program making the computer to perform a process including: storing propagation information data including information to be propagated within a plurality of groups to be evaluated; and evaluating an influence that one group, which is selected from among the plurality of groups, has on other group by analyzing the propagation information data stored.

BRIEF DESCRIPTION OF THE DRAWINGS

The above objects and advantages of the present invention will become more apparent by describing in detail of a preferred embodiment thereof with reference to the accompanying drawings, wherein:

FIG. 5 is a diagram showing an example message log for email stored in a log DB shown in FIG. 4;

FIG. 6 is a diagram showing a specific example of the message log shown in FIG. 5;

FIG. 7 is a diagram showing the structure of an analysis and evaluation program that is executed by the analysis land evaluation apparatus shown in FIGS. 1 and 2;

FIG. 8 is a diagram showing organization information stored in an organization and individual DB shown in FIG. 7;

FIG. 9 is a diagram showing a specific example for the organization information shown in FIG. 8;

FIG. 10 is a diagram showing personal information stored in the organization and individual DB shown in FIG. 7;

FIG. 11 is a diagram showing a specific example of the personal information shown in FIG. 10;

FIG. 12 is a diagram showing example organizational communication information that is stored in a log DB by a log collection and management unit;

FIG. 13 is a diagram showing a specific example of the organizational communication information shown in FIG. 12;

FIGS. 18A through 18C are diagrams showing specific examples of the common word information shown in FIG. 17;

FIG. 19 is a second diagram showing example intra-organizational common word information that is stored in the analysis and evaluation result DB by the analysis and evaluation unit shown in FIG. 7;

FIG. 20 is a diagram showing a specific example of a common concept shown in FIG. 19;

FIG. 21 is a first diagram showing the inter-organizational communication information preparation processing performed by the analysis and evaluation unit shown in FIG. 7;

FIG. 22 is a diagram showing a specific example of inter-organizational communication information shown in FIG. 19;

FIG. 23 is a second diagram showing the inter-organizational communication information preparation processing performed by the analysis and evaluation unit shown in FIG. 7;

FIG. 25 is a first diagram showing example individual-based common word information that is stored in the analysis and evaluation result DB by the analysis and evaluation unit shown in FIG. 7;

FIG. 26 is a second diagram showing example individual-based common word information that is stored in the analysis and evaluation result DB by the analysis and evaluation unit shown in FIG. 7;

FIG. 27 is a first diagram showing example influence evaluation results that are stored in the analysis and evaluation result DB by the analysis and evaluation unit shown in FIG. 7;

FIG. 28 is a diagram showing a specific example of an extent of influence shown in FIG. 27;

FIG. 29 is a diagram showing an example strength of influence;

FIG. 30 is a second diagram showing example influence evaluation results that the analysis and evaluation unit shown in FIG. 7 stores in the analysis and evaluation result DB;

FIG. 33 is a diagram showing a specific example of the extent of influence obtained for each concept;

FIG. 34 is a diagram showing a specific example of the strength of influence obtained for each concept;

FIG. 35 is a diagram showing the analysis and evaluation sequence (S10) performed by a network system; and FIG. 36 is a flowchart showing the analysis and evaluation processing shown in FIG. 35, performed by the analysis and evaluation unit shown in FIG. 7.

DETAILED DESCRIPTION OF THE PREFERRED EMBODIMENT

Figure 1:
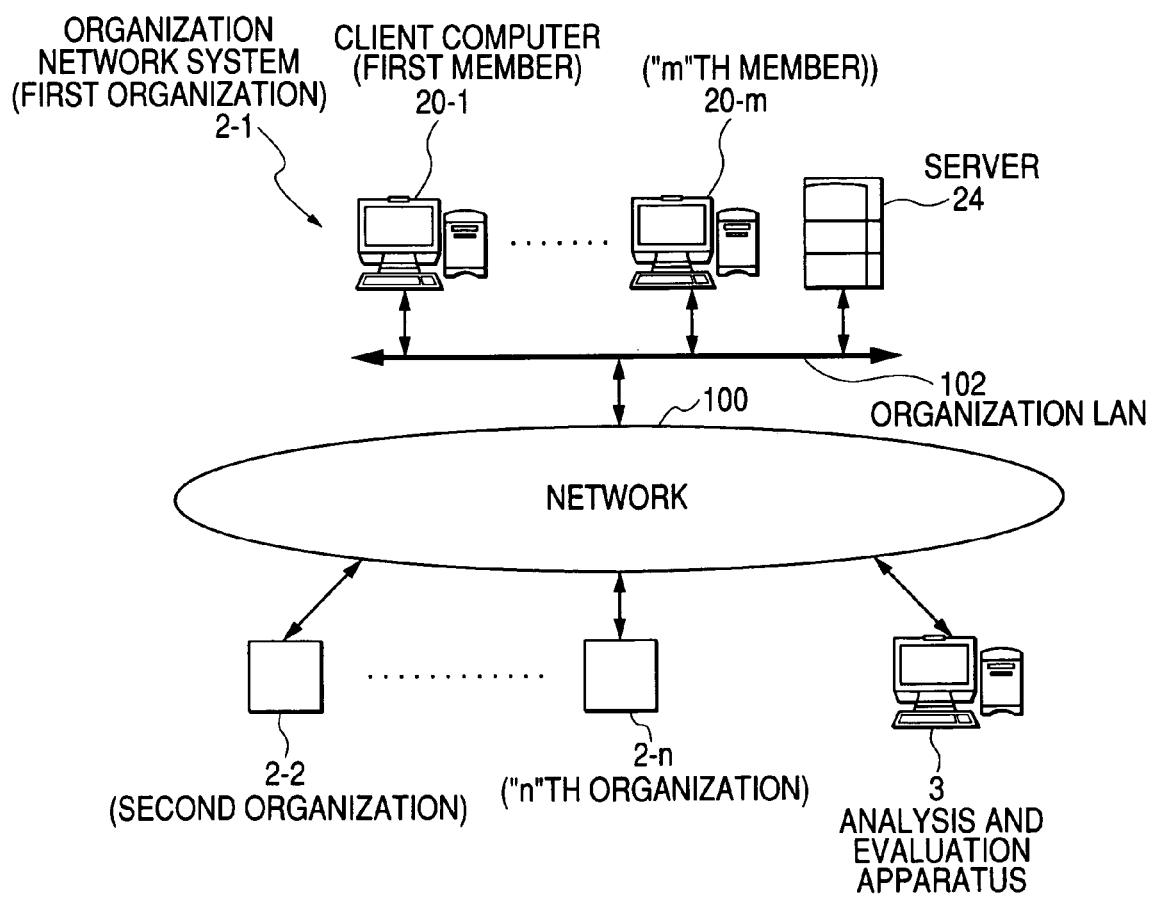
FIG. 1 is a diagram showing an example configuration for a network system for which an evaluation method according to the present invention is applied.

In order to easily understand the present invention, an overall concept of the present invention will be described prior to describing the details of the preferred embodiment of the invention.

Hereinafter, in this description, the words "propagation" and "propagate" are used as a same meaning as the words "transmission" and "transmit".

The value of an organization (unconcerned with whether an organization is a substantial one, such as the a organization of a company, or a virtual one, such as an mailing list) is conventionally evaluated through an official trading performed between a specific organization and an organization external to the specific organization, through services provided to the external organization, or through earnings from the external organization.

For example, for a company, organizations that are sorted by functions to resolve problems that are hierarchically classified are arranged hierarchically, and each problem is resolved by propagating an order to the corresponding organization.

Conventionally, in this system for a company, the value of one organization is evaluated, for example, as a difference and a ratio between the input of resources, such as persons, things and money, to the organization for its own sake and the output, such as an economical value or a service provided as a result.

However, both from the academic aspect and the actual business aspect, it has been pointed out that the value of an organization cannot be fully evaluated merely from the viewpoint of the difference and the ratio between the input and the output.

Further, for a field such as business administration, it is also pointed that the method for resolving the problem using the hierarchical organization cannot rapidly cope with a variety of client demands.

To handle these points, one proposal is provided whereby a flat structure is used for the organizations within a company by the introduction of IT (Information Technology), and thereafter, self-controlled and decentralized activities are recommended to the member organizations, and in order to resolve problems, the distribution of resources is flexibly changed and optimized.

However, when the flat structure is used for organizations, it is extremely difficult for the values of the organizations and their members to be evaluated based on the difference and the ratio between the input and the output.

The reason for this, as is described above, is that since the flat structure for the organizations can be flexibly changed, originally an organization is not formed in order to resolve a specific problem. Further, the members of the organization may be constantly changed, so that one member may belong to a plurality of organizations, officially or unofficially. Furthermore, after the problem has been resolved, the organization is dispersed. Therefore, it is difficult to evaluate the input directed to and the output provided by an organization.

According to the present invention, intra-organizational or inter-organizational communication (organizational communication) is focused on, regardless of whether it is official or unofficial.

Specifically, according to the invention, in order to evaluate a value for an organization, the focus is on what kind of communication contents originating (performed) at a specific organization are used by another organization and in what range or scale.

That is, according to the present invention, while the organizational communication is focused on, the value of a specific organization is obtained by using the magnitude that this organization influences the other organizations.

When this point is focused on, it is possible to alternatively evaluate the value of an organization that performs an activity that generates some direct economic value, or one for which evaluation is difficult, such as the provision of information and a service that are not officially the responsibility of the organization, and the value of the communications within the organization.

More specifically, when the focus is on the analysis of the contents of communications originating at a specific organization, while the organization is resolving a problem, and information concerning the organization is propagated to another organization and its members, or is used for the activities of another organization and its members, the difference between the value of the specific organization and the value of the communications within the organization can be evaluated.

For example, it is not only possible to correctly and objectively evaluate the value to a company of a organization that actually attains a profit, but also the value to the company of a organization that seems less valuable because, although it achieves no profits, it actually benefits many other organizations in the company and indirectly contributes to the realization of a large profit. Therefore, from this viewpoint, understanding the value to the company of all organizations is an effective means for appropriately distributing investments and budgets, and can contribute to the performance results attained by the company.

In the present invention, by analyzing the communications within an organization, the objective value of the organization can be evaluated.

Example means (media) for organizational communication can be oral means, telephones, video telephone systems and computer networks (e.g., emails, electronic bulletin board systems, chat rooms and instant messaging).

To achieve the present invention, it is assumed that communications performed through these media are surveyed and aggregated.

In order to simplify and specify the following explanation, the use of email for internal company communications is used as an example.

When email is used for internal company communications, generally, a message propagated as an email is written using natural language, and the email sender and recipient and the date and time propagated are recorded in a message log.

A propagation server called an SMTP (Simple Mail Transfer Protocol) server is used for the distribution of an email when it is sent over the Internet.

Therefore, when a company employs an SMTP server to one-dimensionally record email message logs, the sender, the recipient, the time and the contents of a communication can be readily ascertained by all the employees of the company.

According to the invention, the message log for an SMTP server used by a company for the internal distribution of email is analyzed when company organizations are evaluated to ascertain their relative values.

[Embodiment]

Hereinafter, one embodiment of the present invention will now be described.

[Network System 1]

FIG. 1 is a diagram showing an example configuration for a network system for which an evaluation method according to the invention is applied.

The network system 1 is, for example, a wide area network (WAN) spanning a plurality of offices in the same company. As is shown in FIG. 1, a plurality of organizations (first to "n"th organizations) to be evaluated, organization systems 2-1 to 2-$n$ ($n \geq 2$) that are used for the member organizations, and an analysis apparatus 3 are interconnected via a network 100.

Hereinafter, a plurality of components, such as the organization systems 2-1 to 2-$n$, are described simply as the organization system 2, unless a specific system is designated.

As an example configuration for the organization system 2, client computers 20-1 to 20-$m$ ($m \geq 1$), each used by members (constituted by "m" members) of an organization, are connected to a server 24 by an organization LAN 102 spanning all computers in the organization.

[Hardware Arrangement]

Figure 2:
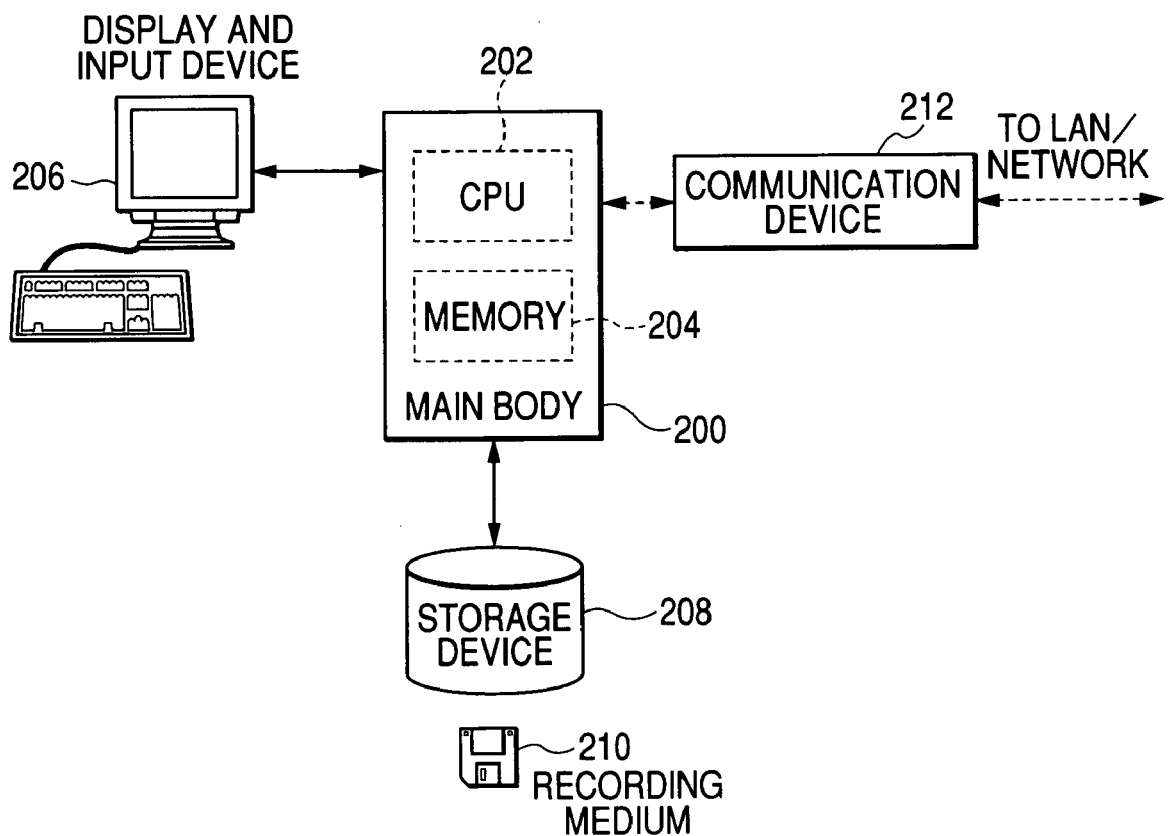
FIG. 2 is a diagram showing the hardware configuration for a client computer, a server and an analysis and evaluation apparatus shown in FIG. 1.

FIG. 2 is a diagram showing a hardware arrangement for the client computer 20, the server 24 and the analysis and evaluation apparatus 3 shown in FIG. 1.

As is shown in FIG. 2, the client computer 20, the server 24 and the analysis and evaluation apparatus 3 each include: a main body 200, including a CPU 202 and a memory 204; display and input devices 206, including a keyboard and a mouse (not shown); a storage device 208, such as an HDD or a CD drive; and a communication device 212, which uses the organization LAN 102 to communicate with the network 100.

That is, included in the client computer 20, the server 24 and the analysis and evaluation apparatus 3 are components for a common computer that can perform network communication.

[Client Program 22]

Figure 3:
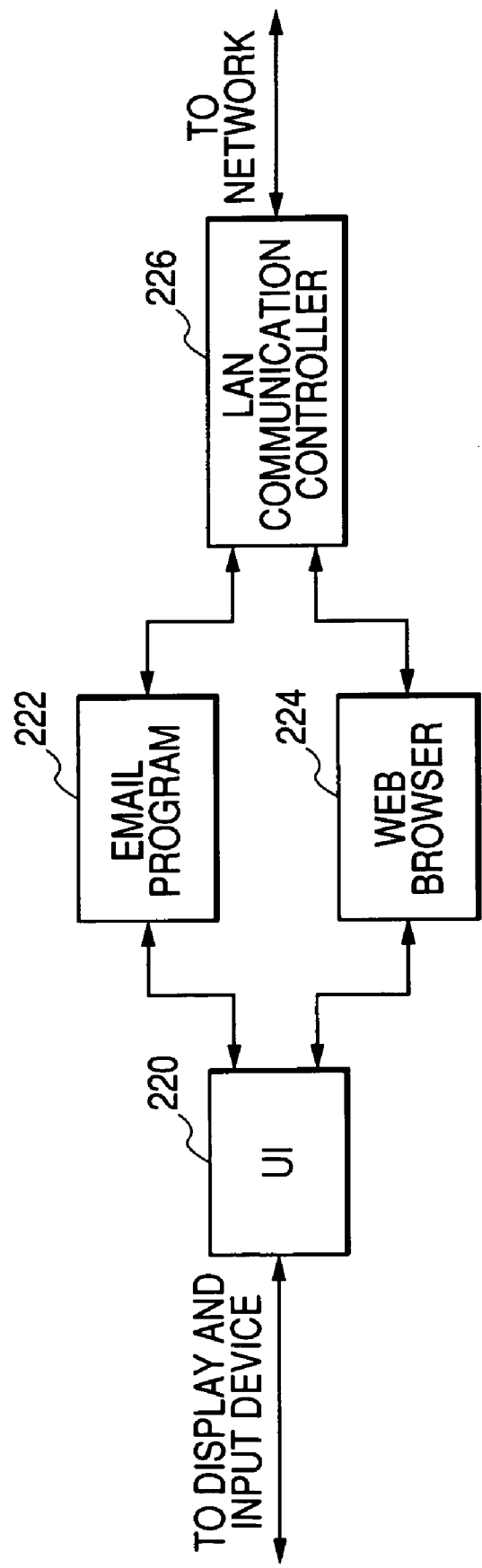
FIG. 3 is a diagram showing the structure of a client program that is executed by the client computer shown in FIGS. 1 and 2.

FIG. 3 is a diagram showing the structure of a client program 22 that is executed by the client computer 20 shown in FIGS. 1 and 2.

As is shown in FIG. 3, included in the client program 22 are a user interface (UI) unit 220, an email program 222, a web browser 224 and a LAN communication controller 226.

The client program 22, which is stored on a recording medium 210, for example, that is provided for the storage device 208 of the client computer 20, is loaded into the memory 204 and executed.

With these components in FIG. 3, the client program 22 provides an email propagation/reception function and a WWW browsing function for the members (users) of an organization that employs the client computer 20.

The UI unit 220 of the client program 22 accepts an entry by a user through the display and the input device 206 (FIG. 2), and controls the processes performed by the member components of the client program 22.

Further, for a user, the UI unit 220 displays emails received by the email program 222 and data obtained from the WWW by the web browser 224.

The email program 222 provides the email propagation/reception function for the user of the client computer 20.

The web browser 224 provides the WWW browsing function for the user of the client computer 20.

The LAN communication controller 226 controls communication, through the organization LAN 102 (FIG. 1) and the network 100, with another client computer 20 in the same organization or the server 24 (the component acting as the main communication body is also generally referred to as a communication node) and communication with the communication node of another organization.

[Server Program 26]

Figure 4:
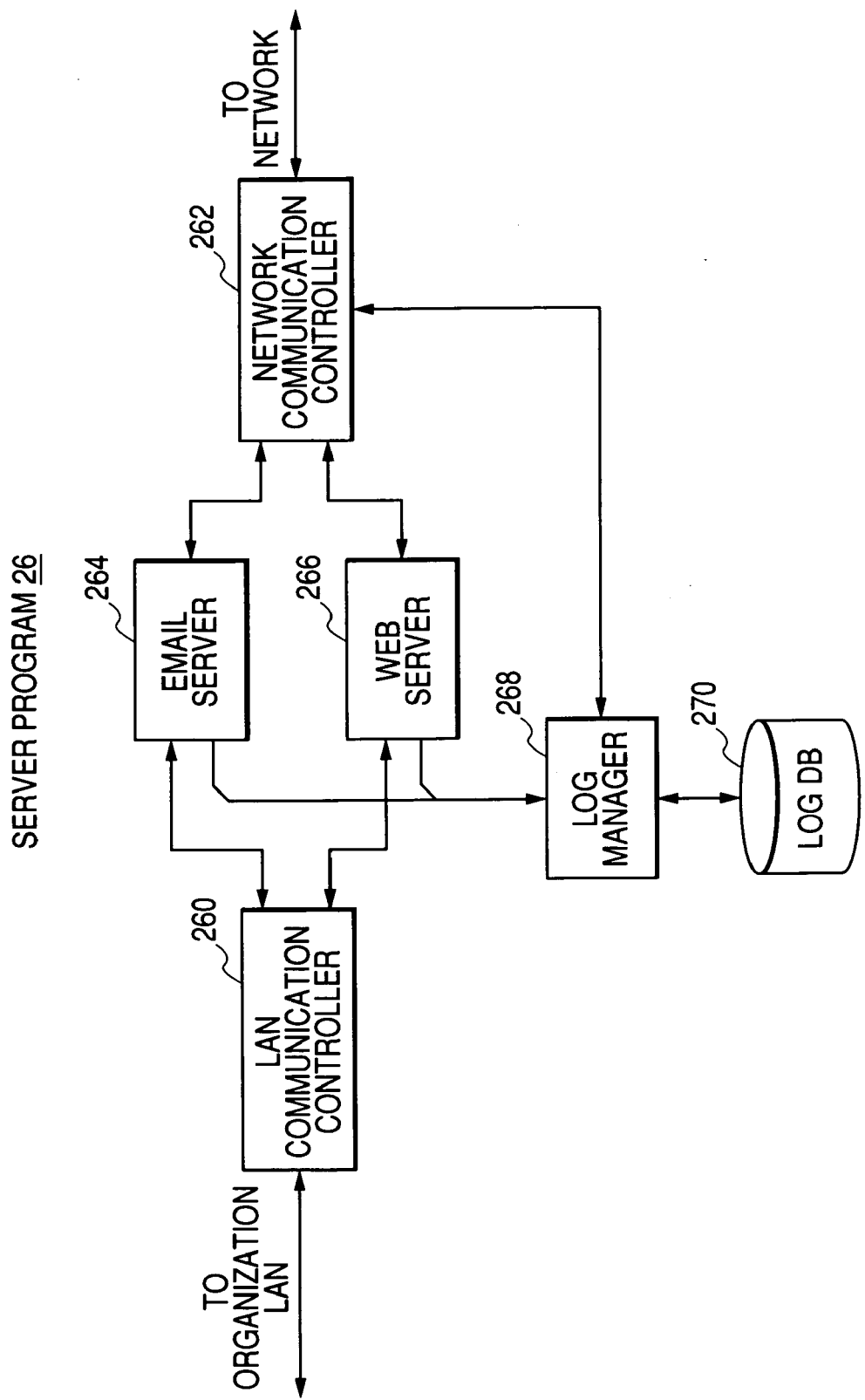
FIG. 4 is a diagram showing the structure of a server program that is executed by the server shown in FIGS. 1 and 2.

FIG. 4 is a diagram showing the structure of a server program 26 executed by the server 24 shown in FIG. 2.

As is shown in FIG. 4, the server program 26 includes a LAN communication controller 260, a network communication controller 262, an email server program 264, the web server 266, a log manager 268 and a log database (log DB) 270.

The server program 26, as well as the client program 22 (FIG. 3), is supplied from the recording medium 210 (FIG. 1) to the storage device 208 in FIG. 2) of the server 24, loaded into the memory 204 and executed.

With the components shown in FIG. 4, the server program 26 provides an email server function for the client computers 20 (members) belonging to the same organization system 2 (organization), and provides a WWW server function for the client computers 20 (members) of the same or a different organization system 2 (organization).

The LAN communication controller 260 of the server program 26 controls communications with the organization LAN 102 (FIG. 1).

The network communication controller 262 controls communications with the network 100.

And the email server program 264 performs the email server function.

The web server 266 performs the WWW server function.

FIG. 5 is a diagram showing example email entries that are stored in the log DB 270 in FIG. 4.

FIG. 6 is a diagram showing a specific example of the use of the message log in FIG. 5.

In accordance with control data received from the analysis and evaluation apparatus 3 through the network communication controller 262, the log manager 268 records, in the log DB 270, a message log for communications handled by the email server program 264 and the web server 266.

Further, under the control of the analysis and evaluation apparatus 3, the log manager 268 propagates the message log in the log DB 270 to the analysis and evaluation apparatus 3 through the network communication controller 262 and over the network 100.

As is shown in FIGS. 5 and 6, the message log recorded by the log manager 268 includes for each email an ID (a communication ID), identification data (IDs) for the sender and the recipient, message contents (communication contents), and a transmission date and time (communication date and time).

[Analysis And Evaluation Program 30]

FIG. 7 is a diagram showing the structure of an analysis and evaluation program 30 that is executed by the analysis and evaluation apparatus 3 shown in FIGS. 1 and 2.

As is shown in FIG. 7, the analysis and evaluation program 30 includes a network communication controller 300, a log collection and management unit 302, a log DB 304, an analysis and evaluation unit 306, an analysis and evaluation result DB 308, an organization and individual DB 310 and a UI unit 312.

The analysis and evaluation program 30, as well as the client program 22 (FIG. 3) and the server program 26 (FIG. 4), is supplied from the recording medium 210 to the storage device 208 of the analysis and evaluation apparatus 3 and is loaded into the memory 204 and executed.

The analysis and evaluation program 30 employs these components to collect the email message logs and the WWW browsing logs from the servers 24 (FIG. 1) of the organization systems 2-1 to 2-2n, analyzes these message logs, and evaluates and ascertains the values of the organizations.

While the operation of the invention for evaluating and ascertaining the value of an organization can be performed by analyzing a WWW browsing log, as is described above, a method for analyzing an email message log and evaluating and ascertaining the value of an organization used for the embodiment.

The network communication controller 300 of the analysis and evaluation program 30 controls communication with the network 100.

The UI unit 312 accepts a user entry from the display and input device 206, and controls the processes performed by the individual sections of the analysis and evaluation program 30.

In addition, in accordance with an operation performed by a user, the UI unit 312 displays on the display and input device 206 the log stored in the log DB 304, and the analysis results and evaluation results stored in the analysis and evaluation result DB 308.

FIG. 8 is a diagram showing organization information stored in the organization and individual DB 310 in FIG. 7.

FIG. 9 is a diagram showing a specific example of the organization information in FIG. 8.

FIG. 10 is a diagram showing personal information stored in the organization and individual DB 310 in FIG. 7.

FIG. 11 is a diagram showing a specific example of the personal information in FIG. 10.

Stored in the organization and individual DB 310 are organization information (shown in FIGS. 8 and 9) for the organizations (shown in FIG. 1) that employ the organization systems 2-1 to 2-*n*, and personal information (shown in FIGS. 10 and 11) for the members of the organizations.

As is shown in FIGS. 8 and 9, in the organization and individual DB 310, identifiers (organization IDs) for the organizations 1 to n, organization names, organization forms, periods (existence periods) for the organization existence, and upper organizations when such are present for the organizations, are stored as organization information for the organizations.

Further, as is shown in FIGS. 10 and 11, in the organization and individual DB 310, identifiers (personal IDs or employee IDs) of the members, the names and email addresses of the members, and the organization IDs (FIG. 8) of the organizations to which the members belong are stored as personal information for the members of the organizations.

For the organizations shown in a conventional organizational tree, "formal" is entered in the columns of the organization forms for the organization information shown in FIGS. 8 and 9.

Further, "semi-formal" is entered for cross-sectional groups, which are not shown in the organization chart, to exchange information through backstairs gossip or by using a mailing list.

In addition, "project" is entered for groups that perform cross-sectional activities within a specified duration.

The organization ID is uniquely correlated with each organization and is used to indicate correspondence thereof with an upper organization.

The organization name is the name used in the organization chart, or the name of an informal or project organization.

The existence period for the organization represents a period extending from the start of the organization to the end.

In the columns of the organization forms shown in FIGS. 8 and 9, organization attributes (e.g., normal organizations, projects, communities) are entered for formal organizations shown in the organizational tree of a company, a cross-sectional project organization constituting a plural formal organizations to achieve a specific objective, an organization such as a community based on voluntary participation, and a group having the same interests and sharing information.

FIG. 12 is a diagram showing organizational communication information that the log collection and management unit 302 stores in the log DB 304.

FIG. 13 is a diagram showing a specific example for the organizational communication information in FIG. 12.

For the organizational communication information shown in FIGS. 12 and 13, an organizational communication ID is uniquely provided for each communication.

The sender ID and the recipient ID correspond to the personal information shown in FIG. 10, and in accordance with the correspondence of the personal information with the organization information, the sender organization ID and the recipient organization ID can be obtained.

Further, information, such as a conversation between the organizations of the sender ID and the recipient ID, is entered in the field for the communication contents, and a date and time for this communication is correlated.

In FIGS. 12 and 13, one sender and one recipient are shown. However, when the data structure in FIG. 12 is appropriately changed, organizational communication information for one-to-multiple emails on the mailing list can also be stored in the log DB 304.

The log collection and management unit 302 collects the message logs in FIG. 5 from the servers 24 of the organization systems 2-1 to 2-*n* over the network 100, and stores the message logs in the log DB 304.

Figure 14:
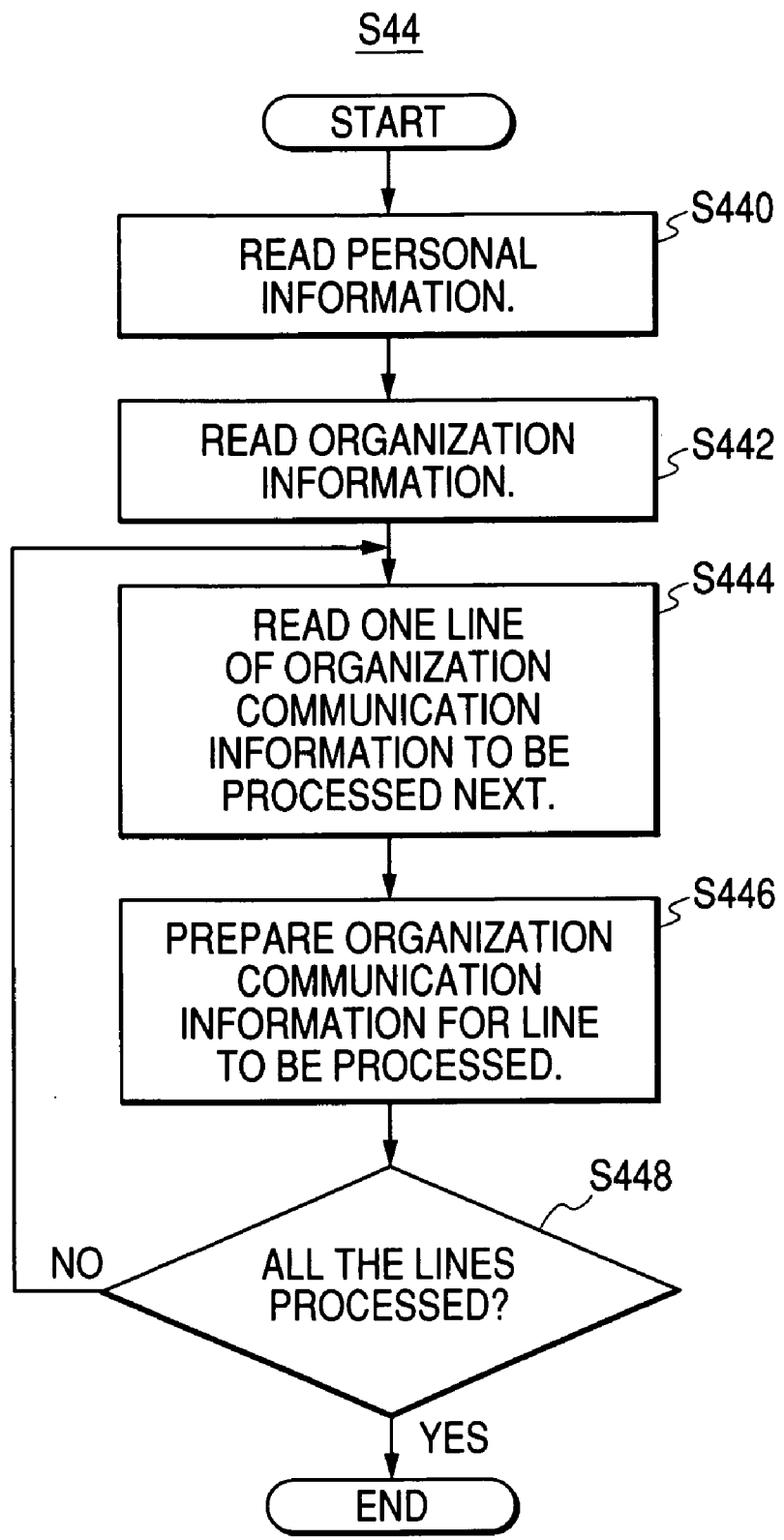
FIG. 14 is a flowchart showing the organizational communication information preparation processing (S24) performed by a log collection and management unit shown in FIG. 7.

FIG. 14 is a flowchart showing the organizational communication information preparation processing (S44) performed by the log collection and management unit 302 shown in FIG. 7.

As is described above, the log collection and management unit 302 examines the organization and individual DB 310; correlates the message log obtained from each server 24 with the organization information shown in FIGS. 8 and 9 and the personal information shown in FIGS. 10 and 11; prepares the organizational communication information (FIGS. 12 and 13) as explained below; and stores the organizational communication information in the log DB 304.

At step 440 (S440), the log collection and management unit 302 reads personal information.

At step 442 (S442), the log collection and management unit 302 reads organization information.

At step 444 (S444), the log collection and management unit 302 employs, as a target to be processed, each line of the organizational communication information from the beginning, and reads, as the target, the first line of the organizational communication information that has not yet been processed.

At step 446 (S446), the log collection and management unit 302 correlates, with the line to be processed, the sender ID in the organizational communication information, the recipient ID, the sender organization ID and the recipient organization ID, and prepares organizational communication information for the line to be processed.

At step 448 (S448), the log collection and management unit 302 determines whether all the lines of the organizational communication information have been processed.

When all the lines have been processed, the log collection and management unit 302 terminates the processing. In the other case, the log collection and management unit 302 returns to the process at S444.

When the processing in FIG. 14 is used for communication using common emails, the log collection and management unit 302 employs the email addresses of the sender and the recipient to search for the personal information (FIG. 10) stored in the organization and individual DB 310. When the personal ID (employee ID) of a member $M_i$ who issued the email and the personal ID (employee ID) of a member $M_j$ (i and j=1 to m) who received the email are obtained, the log collection and management unit 302 defines as the sender ID the personal ID (employee ID) of the member $M_i$ who sent the email, and defines as the recipient ID the personal ID of the member $M_j$ who received the email.

Further, the log collection and management unit 302 employs the recipient ID and the sender ID to search for the organization information (FIG. 8) stored in the organization and individual DB 310, and defines as the sender organization ID the organization ID of an organization P that the member $M_i$ who sent the email belongs to, and defines as the recipient organization ID the organization ID of an organization Q (P and Q=1 to n) that the member $M_j$ who received the email belongs to.

Furthermore, the log collection and management unit 302 adds, to each set of information obtained as the search result, an identifier (organizational communication ID) the message contents of the email as the communication contents, the transmission date and time for the email, and the organization form. Thus, the organizational communication information in FIG. 12 is prepared and stored in the log DB 304.

[Analysis and Evaluation Unit 306]

An explanation will now be given for the analysis processing and the evaluation processing performed by the analysis and evaluation unit 306.

[Analysis of Common Word]

The analysis and evaluation unit 306 extracts from the log DB 304 organizational communication information (FIG. 12) for which the sender organization ID is identical to the recipient organization ID.

That is, the analysis and evaluation unit 306 extracts the organizational communication information (intra-organizational communication information) for an email message that is exchanged by the members $M_i$ and $M_j$ (client computers 20-$i$ and 20-$j$) of each of the organizations P (organization systems 2-1 to 2-$m$).

Then, the analysis and evaluation unit 306 analyzes the communication contents of the organization (organization correlated with the sender organization ID and the recipient organization ID in accordance with the organization information shown in FIGS. 8 and 9) to which the sender (ID) and the recipient (ID) included in the intra-organizational information belong. Then, for each organization (sender organization ID) included in the intra-organizational communication information, the analysis and evaluation unit 306 extracts and collects the common concepts used in the individual organizations.

As the common concepts for the organizations, the communication contents of the intra-organizational communication information are generally used as units for natural language processing. The common concepts can be words, sentences, synonyms of a common word, a semantic network using the common word and the synonyms, and the ontology (a set of common concepts used in the organization P).

Figure 15:
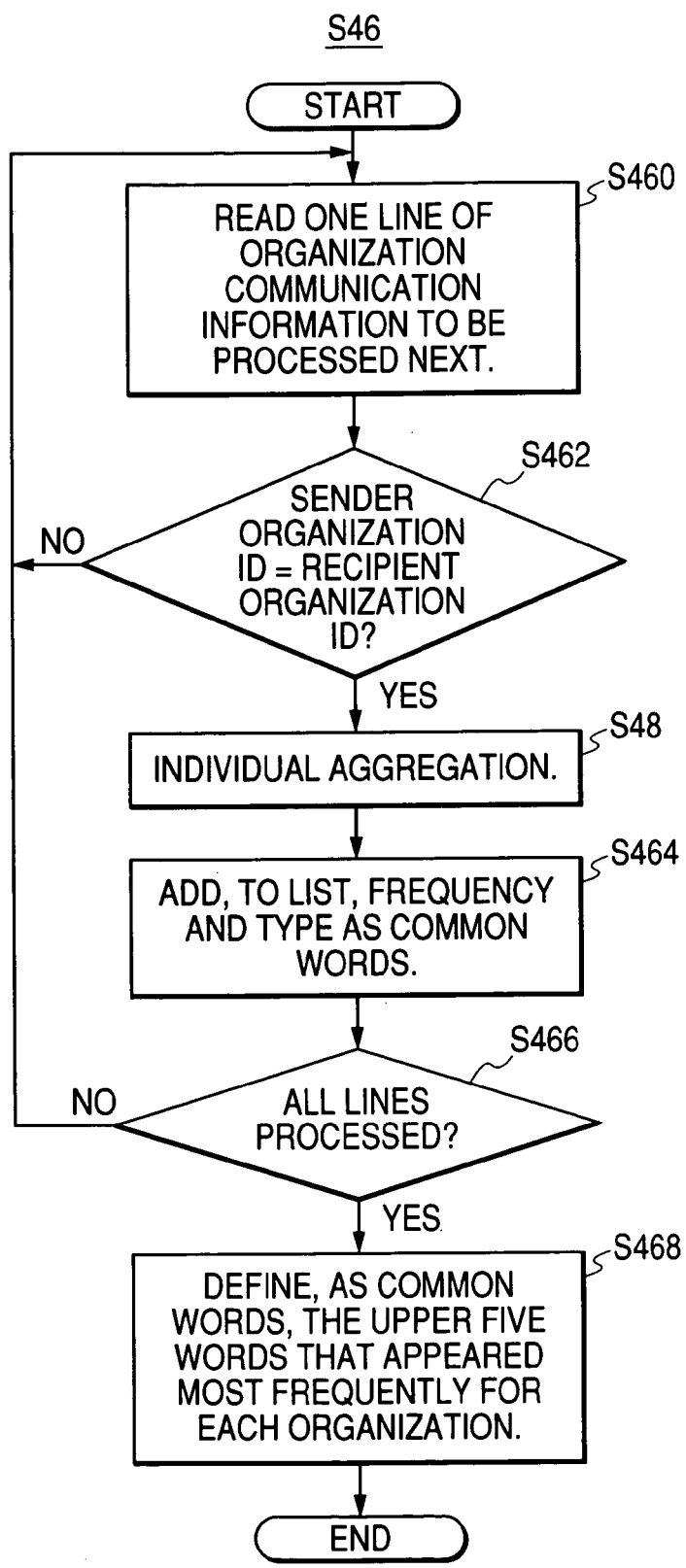
FIG. 15 is a flowchart showing the processing (S26) performed by an analysis and evaluation unit shown in FIG. 7 for extracting and aggregating, as common concepts, words (common words) that are used in common.

FIG. 15 is a flowchart showing the processing (S46) performed by the analysis and evaluation unit 306 to extract and collect, as common concepts, words (common words) that are used in common.

As is shown in FIG. 15, at step 460 (S460), the analysis and evaluation unit 306 employs, as a target to be processed, each line of the organizational communication information from the beginning, and reads the first line of the organizational communication information that has not yet been processed.

At step 462 (S462), the analysis and evaluation unit 306 determines whether the sender ID and the recipient ID are the same for the line that was read at S460.

When the sender ID and the recipient ID are identical, the analysis and evaluation unit 306 advances to S48. In the other case, the analysis and evaluation unit 306 returns to S460.

At step 48 (S48), the analysis and evaluation unit 306 performs the individual collection processing.

This individual collection processing will be described later while referring to FIG. 16.

At step 464 (S464), the analysis and evaluation unit 306 defines as a common word choice for the sender organization (ID) the word obtained as the individual collection result, and adds the frequency and the word type to the list.

At step 466 (S466), the analysis and evaluation unit 306 determines whether all the lines of the organizational communication information have been processed.

When all the lines have been processed, the analysis and evaluation unit 306 advances to S468. In the other case, the analysis and evaluation unit 306 returns to S460.

At step 468 (S468), the analysis and evaluation unit 306 defines as common words the upper five words that appear most frequently in each organization.

The list obtained at S464 can include a great number of words; however, by employing the process at S468, the number of words can be limited.

Figure 16:
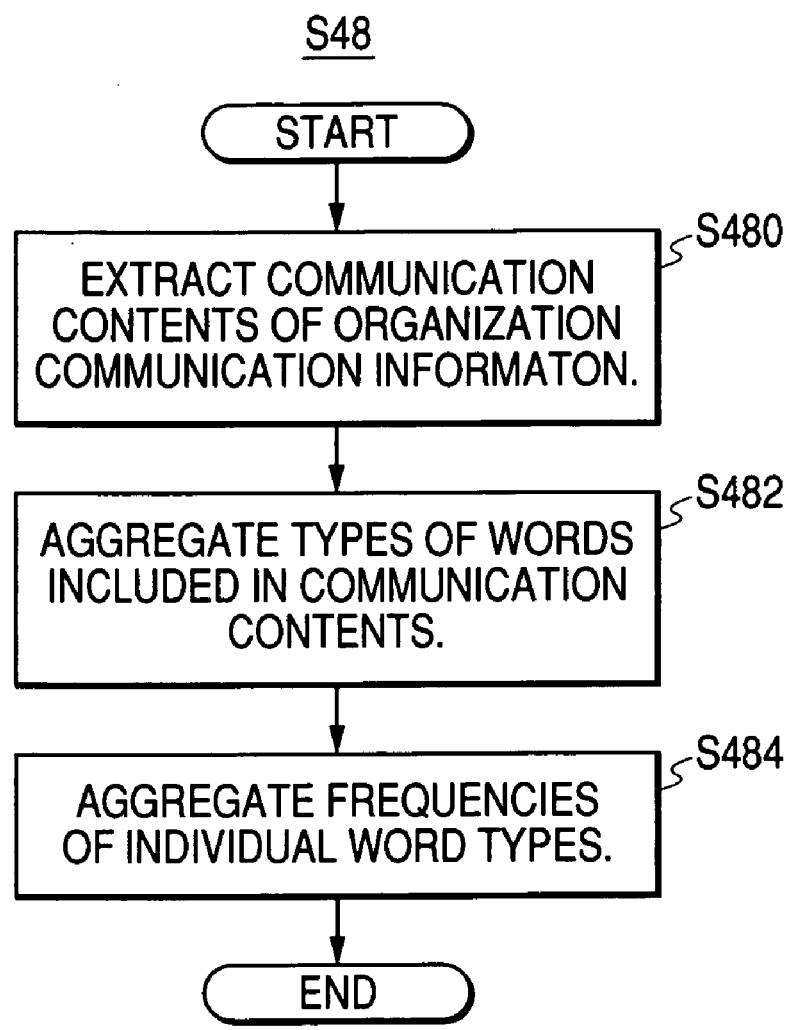
FIG. 16 is a flowchart showing the individual aggregation process (S48) shown in FIG. 15.

FIG. 16 is a flowchart showing the individual collection processing (S48) in FIG. 15.

As is shown in FIG. 6, at step 480 (S480) the analysis and evaluation unit 306 extracts the communication contents from the line of the organizational communication information to be processed, and divides the line into words.

During this process, the analysis and evaluation unit 306 divides the contents into parts of speech, for example, through morphemic analysis, and extracts nouns as expression elements.

As an expression element other than a noun, the analysis and evaluation unit 306 may employ another part of speech, such as a verb, a set of several parts of speech, or a phrase.

At step 482 (S482), the analysis and evaluation unit 306 counts the number of word types based on the expression elements obtained at S480.

At step 484 (S484), the analysis and evaluation unit 306 counts the frequency at which each of the word types obtained at S482 appears.

In the individual collection processing, the analysis and evaluation unit 306 may extract proper nouns, and may calculate a total for the frequency at which each proper noun appears, instead of simply aggregating the frequency of a word.

Figure 17:
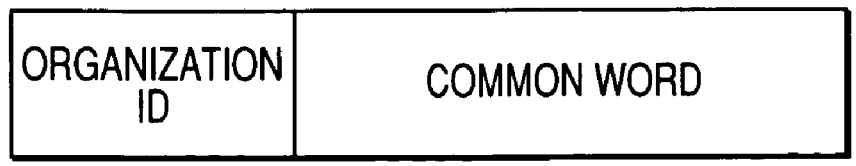
FIG. 17 is a first diagram showing example intra-organizational common word information that is stored in an analysis and evaluation result DB by an analysis and evaluation unit shown in FIG. 7.

FIG. 17 is a first diagram showing example information that the analysis and evaluation unit 306 in FIG. 7 stores in the analysis and evaluation result DB 308 for a word common to an organization.

FIGS. 18A through 18C are diagrams showing specific example common word information presented in FIG. 17.

The analysis and evaluation unit 306 selects, as common words, words that frequently appear in the communication contents of the intra-organizational communication information of an organization P, e.g., selects three words, X, Y and Z, in the descending order, beginning with the highest frequency. Then, as is shown in FIG. 17, the analysis and evaluation unit 306 adds the organization ID (FIG. 8) of organization P to the words X, Y and Z, and prepares common word information (an attribute). This information is then stored in the analysis and evaluation result DB 308.

As is shown in FIGS. 18A through 18C, the common word information is entered in a list correspondent with the organization ID.

FIG. 19 is a second diagram showing an example concept common to an organization, which the analysis and evaluation unit 306 in FIG. 7 stores in the analysis and evaluation result DB 308.

FIG. 20 is a diagram showing a specific example for a common concept in FIG. 19.

As is described above, the analysis and evaluation unit 346 extracts information representing another concept for a common word, such as a sentence included in the communication contents of the intra-organizational communication information, synonyms for the common word, a semantic network for the common word and the synonyms, and an ontology (a set of common concepts that is used in the organization P).

As is shown in FIG. 17, the analysis and evaluation unit 306 records the extracted words independently.

As is shown in FIG. 19, the analysis and evaluation unit 306 may store the extracted words correspondent with other concepts for the words, e.g., the common word information (FIGS. 17 and 18A through 18C).

Shown in FIG. 20 is a specific example wherein the common synonym is recorded independently as the common concept. The common synonyms can be extracted and aggregated when the analysis and evaluation unit 306 employs an ordinary thesaurus, available on the market, to obtain and aggregate a set of words having the same meaning, and performs the same processing (it should be noted that this processing includes a step of employing all pertinent words in the thesaurus to be compared with the common synonyms) as performed to extract the common word for the organizational communication information.

The matching in this case corresponds to the term "search", a term that is used for a database, and specifically, the common concept, such as a word A, is searched for in a specific communication unit group.

FIGS. 21 and 23 are first and second diagrams showing example inter-organizational communication information generated by the analysis and evaluation unit 306.

FIG. 22 is a diagram showing a specific example of the inter-organizational communication information shown in FIG. 21.

As is shown in FIGS. 21 and 23, the analysis and evaluation unit 306 prepares inter-organizational communication information by adding, to an extracted common word, organization IDs (sender organization ID and recipient organization ID) for the propagation side and the reception side, and stores the inter-organizational communication information in the analysis and evaluation result DB 308.

The analysis and evaluation unit 306 extracts a common concept for organizational communication information (FIGS. 12 and 13) that is exchanged (propagated and received, or transferred) by the two different organizations P and Q (P≠Q in this case), and stores the common concept in the analysis and evaluation result DB 308.

Figure 24:
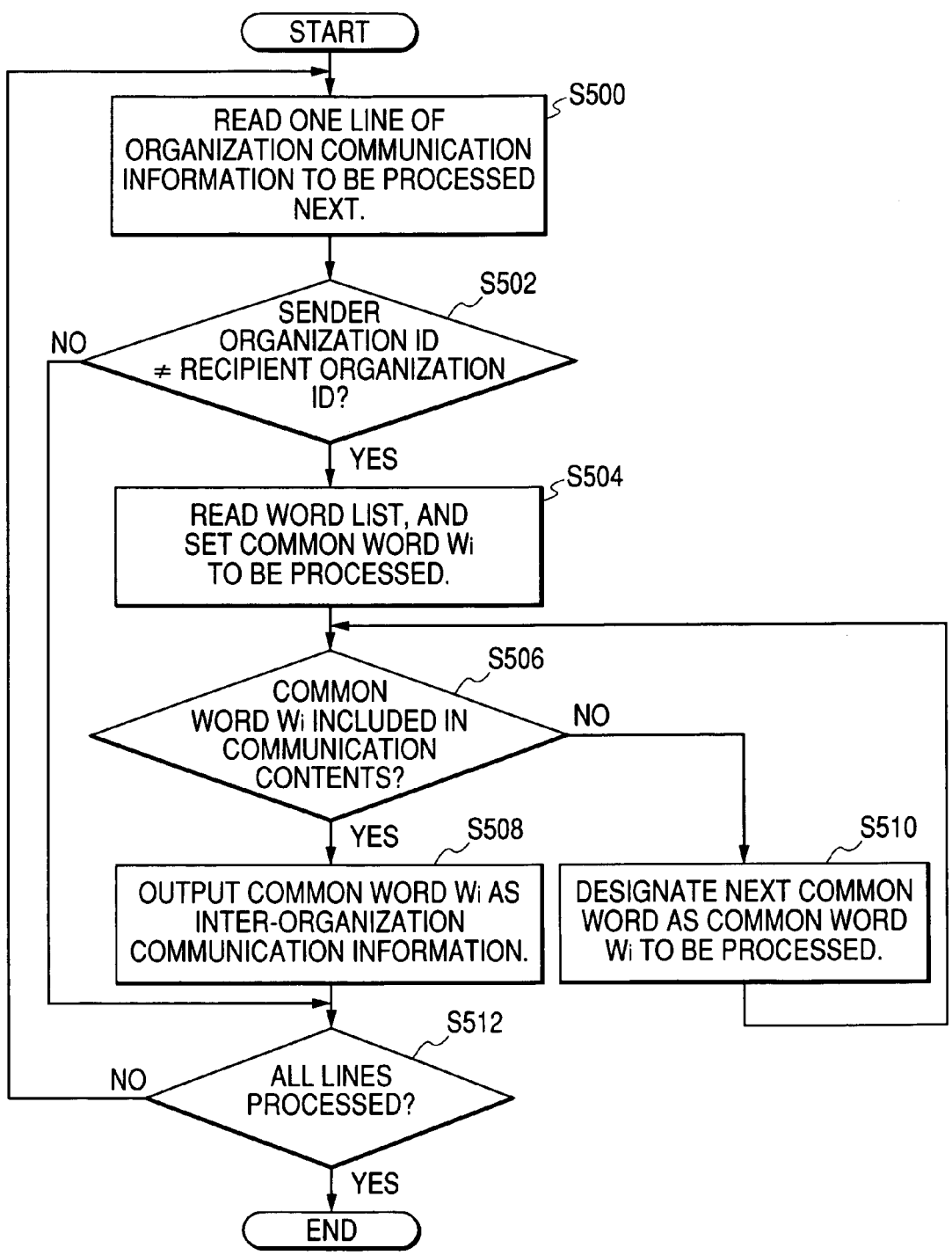
FIG. 24 is a flowchart showing the matching processing (S50) performed by the analysis and evaluation unit in FIG. 7 to extract a common concept from the organizational communication information shown in FIGS. 12 and 13.

FIG. 24 is a flowchart showing the matching processing (S50) performed by the analysis and evaluation unit 306 for extracting a common concept for the organizational communication information (FIGS. 12 and 13).

By employing a specific example wherein a word is obtained as a common concept from emails that have been exchanged and that have originated at two different organizations, an explanation will now be given for the processing whereby the analysis and evaluation unit 306 extracts a common concept for the organizational communication information (FIGS. 12 and 13).

At step 500 (S500), the analysis and evaluation unit 306 employs, as a processing unit, each line of the organizational communication information (FIGS. 12 and 13) beginning with the first line. Of the lines of the organizational communication information that have not yet been processed, the first line is read as a processing target line.

At step 502 (S502), the analysis and evaluation unit 306 determines whether the sender organization ID and the recipient organization ID, which are included in the organizational communication information to be processed, differs from each other.

When the analysis and evaluation unit 306 has determined that the sender organization ID differs from the recipient organization ID, program control advances to step S504. In the other case, program control is shifted to step S512.

That is, when the sender organization ID differs from the recipient organization ID, and when the word (the common concept) of the sender organization is shared by the recipient organization and the sender organization, it is assumed that the sender organization performed communication with (provided influence content for) the recipient organization.

At step 504 (S504), the analysis and evaluation unit 306 reads a common word list for the sender organization ID, which is included in the organizational communication information to be processed. Then, the analysis and evaluation unit 306 designates a common word $W_i$ to be used for the matching processing.

At step 506 (S506), the analysis and evaluation unit 306 determines whether the common word $W_i$ to be processed is included in the communication contents included in the line of the organizational communication information to be processed.

When the analysis and evaluation unit 306 determines that the common word $W_i$ to be processed is included in the line of the organizational communication information to be processed, program control advances to step 508. In the other case, program control is shifted to step 510.

At step 508 (S508), the analysis and evaluation unit 306 stores, as inter-organization information shown in FIG. 21, the common word $W_i$ to be processed.

At step 510 (S510), the analysis and evaluation unit 306 designates, as the next common word $W_i$ to be processed, a common word $W_{i+1}$ that is included in the word list and that as yet has not been processed.

At step 512 (S512), the analysis and evaluation unit 306 determines whether all the lines in the organizational communication information have been processed.

When the analysis and evaluation unit 306 ascertains that all the lines have been processed, the processing is terminated. In the other case, program control returns to step 500.

To summarize the matching processing in FIG. 24, first, the analysis and evaluation unit 306 reads each line of the organizational communication information, extracts the pertinent communication contents, and performs a matching process for the common word (FIGS. 17 and 18) for the sender organization ID, and the communication contents included in the line that has been read.

This matching processing is performed when the sender organization ID and the recipient organization ID, which are included in the organizational communication information to be processed, differs from each other.

As a result of the matching processing, when the common word for the sender organization ID is included in the communication contents, it is assumed that the intra-organizational information exchanged in the sender organization has influenced the recipient organization. This common word is then stored as the inter-organizational communication information shown in FIGS. 21 and 22.

The matching processing is performed for all the common words included on common word lists that are correlated with sender organization IDs included in the line of the organizational communication information to be processed.

When the matching processing has been performed for all the organizational communication information, the inter-organizational communication information (FIGS. 21 and 22) is prepared that indicates the degree of influenceion, i.e., which organization influences which organization through which common word.

When the same processing shown in FIG. 24 is performed for the concept (a sentence, a synonym for the common word, the semantic network using the common word, and the synonym and the ontology), instead of the common word, the inter-organizational communication information (FIG. 23) is prepared that indicates which of the two organizations has provided what kind of content that has influenced the other.

Furthermore, when the extraction and aggregation processing shown in FIG. 15 for the common concept (the word) and the matching processing shown in FIG. 24 are performed for the organizational communication information that is exchanged by two or more organizations, it is possible to understand which organization has influenced which other organization through which common word.

For example, assume that the sender organization P has propagated information to the recipient organizations Q and R. In this case, the sender organization ID is used as the organization ID for the organization P; the recipient organization IDs are used respectively as the organization IDs of the organizations Q and R. When the common word extraction processing in FIG. 15 and the matching processing in FIG. 24 are performed for these IDs, the inter-organizational communication information can be obtained.

FIGS. 25 and 26 are first and second diagrams showing example common word information that the analysis and evaluation unit 306 in FIG. 5 stores in the analysis and evaluation result DB 308 for an individual.

Further, for an individual, in the same manner as is used for the intra-organizational and inter-organization common word information, the analysis and evaluation unit 306 can extract the common word and the concept for the organizational communication information (FIG. 12) from the e-mail exchanged by the members.

Further, as is shown in FIGS. 25 and 26, the analysis and evaluation unit 306 prepares individual-based communication information by adding, to the extracted common word and the concept, the personal IDs (the sender personal ID or the recipient personal ID) of the sender and the recipient. The individual-based communication information is stored in the analysis and evaluation result DB 308.

[Evaluation of Influences Provided by Organizations]

By employing the thus generated intra-organizational communication information (FIGS. 17 and 19) and the individual-based communication information (FIGS. 25 and 26), the analysis and evaluation unit 306 can compare the intra-organizational communication information for the organization P to be evaluated, or the individual-based communication information for the individual $I_i$, with the intra-organizational communication information (FIGS. 17 and 19) for the organization Q (Q=1 to n; Q≠P) and the inter-organizational communication information (FIGS. 21 and 23).

Furthermore, the analysis and evaluation unit 306 determines to be organizations that are influenced by the target organization or individual to be evaluated, an organization for which the intra-organizational communication information includes, as a common word and a concept, the common word and the concept for the target organization or individual, and an organization for which the communication information that is exchanged with the target organization or individual as a sender or a recipient includes, as a common word and a concept, the common word and concept for the target organization or individual.

FIGS. 27 and 30 are first and second diagrams showing example evaluation values that the analysis and evaluation unit 306 in FIG. 7 stores in the analysis and evaluation result DB 308.

FIG. 28 is a diagram showing a specific example for the extent of influence in FIG. 27.

FIG. 29 is a diagram showing a specific example for the strength of influence.

In this case, as an example, the effects are totaled separately to obtain an extent of influence and a strength of influence.

As is shown in FIGS. 27 and 28, the extent of influence is obtained by counting the other organizations that use in common a concept (a common concept) used by a specific organization.

Further, as is shown in FIG. 29, the extent of influence is obtained by examining the frequencies at which a concept used in common by a specific organization and other organizations has appeared in the other organizations.

The processing for evaluating the inter-organizational communication information (in FIGS. 21 and 22) obtained through the processing in FIG. 24 will now be described.

Figure 31:
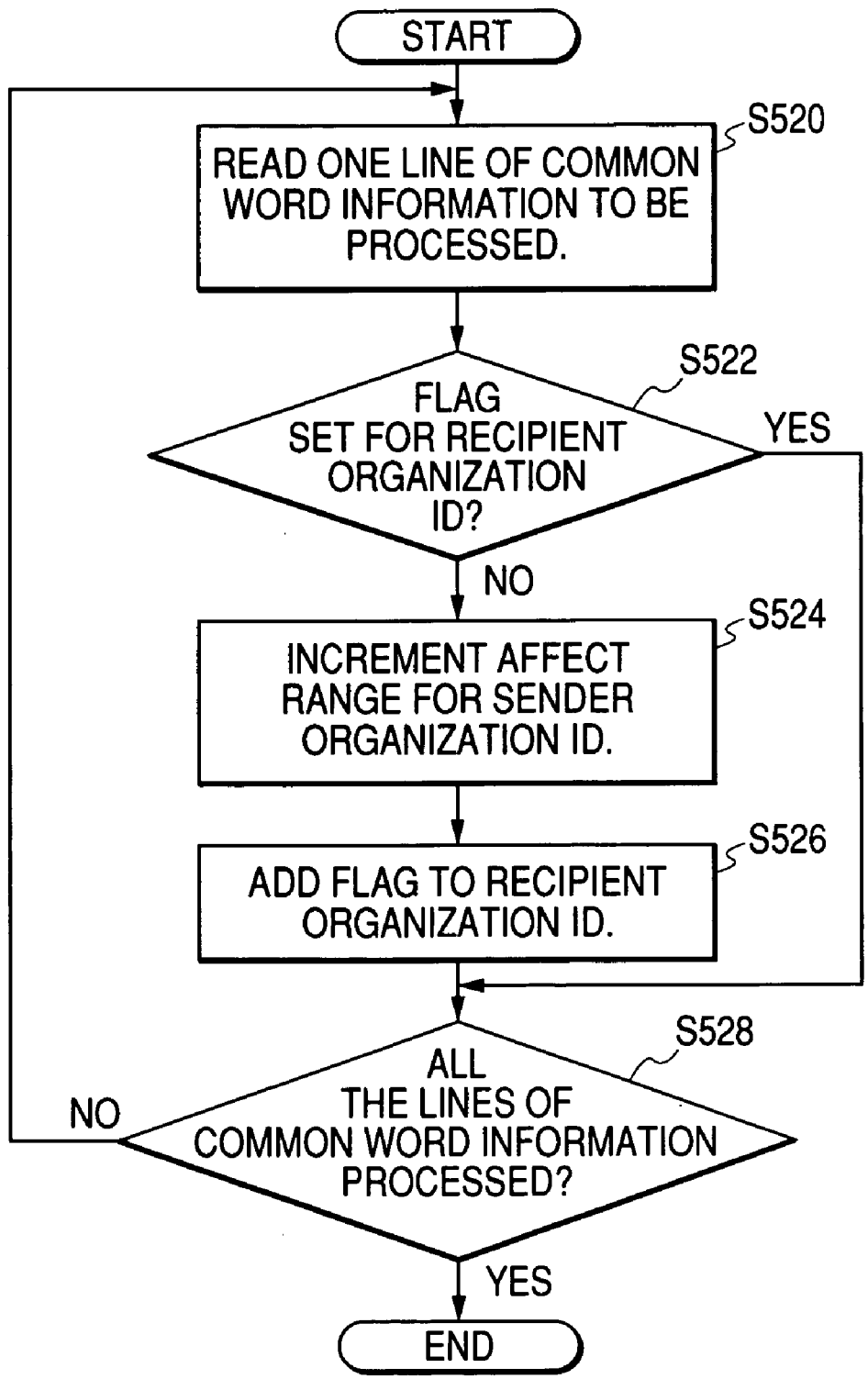
FIG. 31 is a flowchart showing the processing (S52) for calculating the extent of influence shown in FIGS. 27 and 28.

FIG. 31 is a flowchart showing the processing (S52) for calculating the extent of influence in FIG. 27.

As is shown in FIG. 31, at step 520 (S520), the analysis and evaluation unit 306 processes the organizational communication information (FIGS. 21 and 22) for each line, starting at the beginning. That is, of the lines of the inter-organizational communication information that have not yet been processed, the first line is read for processing.

At step 522 (S522), the analysis and evaluation unit 306 determines whether a flag has been set for the recipient organization ID that was included in the line of the inter-organizational communication information read at S520.

When the flag has been set for the recipient organization ID, the analysis and evaluation unit 306 advances to the process at S528. In the other case, the analysis and evaluation unit 306 shifts to the process at S524.

At step 524 (S524), the analysis and evaluation unit 306 increments the value of the extent of influence for the sender organization ID.

At step 526 (S526), the analysis and evaluation unit 306 adds a flag to the recipient organization ID.

At step 528 (S528), the analysis and evaluation unit 306 determines whether all the lines of the inter-organizational communication information have been processed.

When all the lines of the inter-organizational communication information have been processed, the analysis and evaluation unit 306 terminates the processing. In the other case, the analysis and evaluation unit 306 returns to the process at S520.

The processing in FIG. 31 can be summarized as follows.

First, the analysis and evaluation unit 306 reads each line of the inter-organizational communication information (FIGS. 21 and 22).

Then, based on the common word information, the analysis and evaluation unit 306 counts the recipient organizations.

In order to count the recipient organizations without any overlapping, the analysis and evaluation unit 306 adds a flag to the IDs of the recipient organizations that have been counted, so that the analysis and evaluation unit 306 will skip the recipient organizations for which a flag has been provided.

The analysis and evaluation unit 306 performs this counting for all the lines of the inter-organizational communication information, and defines the obtained value as the range within which a specific organization (sender organization) has influenced all the organizations.

Figure 32:
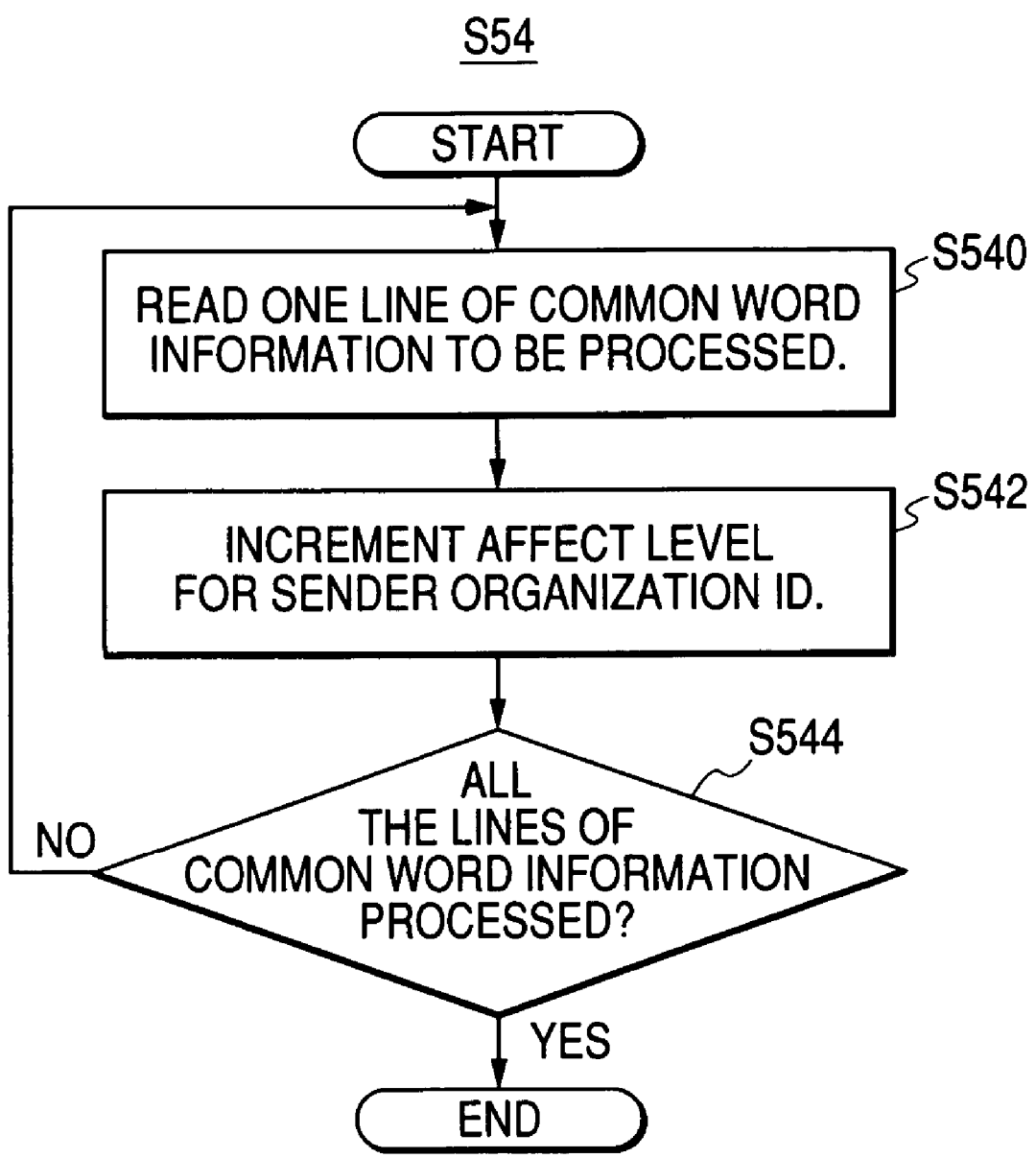
FIG. 32 is a flowchart showing the processing (S54) for calculating the strength of influence shown in FIG.

FIG. 32 is a flowchart showing the processing (S54) in FIG. 29 for calculating the strength of influence.

As is shown in FIG. 32, at step 540 (S540), the analysis and evaluation unit 306, for example, processes the inter-organizational communication information (FIGS. 21 and 22) for each line, starting at the beginning. That is, of the lines of the inter-organizational communication information that have not yet been processed, the analysis and evaluation unit 306 reads the first line for processing.

At step 542 (S542), the analysis and evaluation unit 306 increments the level for a sender organization.

At step 544 (S544), the analysis and evaluation unit 306 determines whether all the lines of the inter-organizational communication information have been processed.

When all the lines of the inter-organizational communication information have been processed, the analysis and evaluation unit 306 terminates the processing. In the other case, the analysis and evaluation unit 306 returns to the process at S540.

The processing shown in FIG. 32 can be summarized as follows.

The analysis and evaluation unit 306 reads each line of the inter-organizational communication information (FIGS. 21 and 22), and finds, for each sender organization, the classified total of the times that a specific common word was used by the recipient organization.

The analysis and evaluation unit 306 performs this aggregation for all the lines of the inter-organizational communication information, and defines the obtained value as the level at which a specific organization (sender organization) has influenced all the organizations.

It should be noted that the analysis and evaluation unit 306 may find the total value of the frequencies at which the common word appeared in the sender organization. In this case, when a common word used more frequently by a specific organization is used by another organization, to calculate the strength of influence for all the other organizations, the analysis and evaluation unit 306 may return a high estimate as the strength of influence for the specific organization.

FIG. 33 is a diagram showing example extent of influences obtained for the individual concepts.

FIG. 34 is a diagram showing example strength of influences obtained for the individual concepts.

FIGS. 28 and 29 are diagrams showing the aggregation results actually obtained by employing the processes in FIGS. 31 and 32.

Since the inter-organizational communication information shown in FIGS. 21 and 22 corresponds to the organizational communication information in FIGS. 12 and 13, the same sender organization ID and recipient organization ID are present. However, since the total values are shown in FIGS. 28 and 29, the organization IDs (sender organization IDs) are not overlapped.

Further, the extent of influences and the strength of influences can be aggregated for each organization ID as is shown in FIGS. 27 and 29, or for each concept as is shown in FIGS. 33 and 34.

The total values shown in FIGS. 33 and 34 are equal to the total values for the extent of influences and the strength of influences for each organization ID shown in FIGS. 28 and 29.

It should be noted that when analyzing the appearance frequency for a common word X, instead of the overall network system (company) 1, only the organization Q of an employee $E_j$ who communicates with an employee $E_i$ of the organization P may be focused on.

When in addition to the organization P, the same word is used by the organization Q merely by coincidence, it is wrong to determine that the organization Q has been influenced by the organization P. And when the above described process is performed, an extent of influence and an strength of influence for which it is determined the influence attribution was erroneous can be removed from the influencing actions by which a specific organization has influenced another organization.

Furthermore, when between the organization P and the organization Q there is no direct communication, but instead, the organizations communicate with each other indirectly, through another organization R, the chained evaluation for the extent of influence and the strength of influence can be performed, and the total of the evaluation values can be used by the organization P to influence the organization Q.

For example, assume that organizations A to D employ a word X for intra-organizational and inter-organizational communications, and that, in accordance with the inter-organizational communication information (FIGS. 21 and 22) obtained from the organizational communication information FIGS. 12 and 13, the organizations A and B and the organizations B and C are linked together by organizational communications that use the common word X. Then, the appearance of the common word X in the organization C can be regarded as the range and the level at which the organization C is influenced by the organization A.

For this chained evaluation, the number of chains to utilize for evaluation must be designated in advance.

For example, when the number of chains is two, and when a word Y is included in the contents of the communications between the organizations A and B, the organizations B and C and the organizations C and D, the extent of influence and the strength of influence for the organization A are not counted for the communications between the organizations C and D.

In addition, when loops from the organization A to B and from the organization B to A have occurred, the processing is terminated at this time.

Further, weighting that depends on the number of chains may be performed when the chained extent of influence and the chained strength of influence are being evaluated.

Assume that when the communications including the common word X are performed in a chained manner from the organization A to B, B to D, and D to E. In order to evaluate the extent of influence and the strength of influence for the organization A, the number of organizations must be incremented only by one to obtain the strength of influence relative to the organization B. While to obtain the range and the level at which the organization D is influenced through the organization B, the number of organizations must be incremented only by ½. Further, to obtain the range and level at which that the organization E is influenced through the organizations B and D, the number of organizations must be incremented only by ¼.

The analysis and evaluation unit 306 identifies the inter-organizational communication information and the intra-organizational communication information shown in FIGS. 17 to 26, the number of sets of personal communication information and the frequency of this information and the organization form (operation), and determines a source organization or individual and a destination organization for the propagation of the common word and concept. As a result, the analysis and evaluation unit 306 can analyze which organization utilizes the information from the organization or individual to be evaluated and how.

The organizational communication information (FIG. 12) includes the sender organization ID, the recipient organization ID and the email transmission date and time. The analysis and evaluation unit 306 traces this information to analyze the period of time involved and the route along which the common word and the concept for the organization or individual to be evaluated were spread.

The analysis and evaluation unit 306 assembles, as needed, the thus obtained analysis and evaluation results to obtain all the analysis results, and stores these results in the analysis and evaluation result DB 308.

The analysis and evaluation processes described above are selectively used or are used together, as needed.

[Overall Operation of Network System 1]

The overall operation of the network system 1 will now be explained.

FIG. 35 is a diagram showing the analysis and evaluation sequence (S10) performed by the network system 1.

As is shown in FIG. 35, a user manipulates the display and input device 206 (FIGS. 1 and 2) of the analysis and evaluation apparatus 3 to select, as the organization p (organization system 2-*p*) to be evaluated, one of the organizations 1 to n (organization systems 2-1 to 2-*n*), and to select the WWW or email as one medium to be evaluated (S100 and S102).

For example, the user of the analysis and evaluation apparatus 3 can designate how communications which an organization Z performs, concerning a project X, have influenced the company.

Further, in addition to the influence on the overall company organization, the user can also designate a range for analyzing the influence that communications which the organization Z performs, concerning the project X, have had on a plurality of organizations or a group of employees in the company.

In this embodiment, as previously described, an email is designated by the user as an example medium.

In accordance with the selection and designation performed by the user, the UI unit 312 of the analysis and evaluation program 30 (FIG. 7) controls the log collection and management unit 302, and propagates, to each of the organizations (organization systems 2-1 to 2-*n*), a signal for accumulating the message logs of the emails (S104).

Upon the reception of this signal, the log manager 268 of the server program 26 that is operated by each of the servers 24 of the organization systems 2-1 to 2-*n* accumulates the message logs for the email that is exchanged internally by the individual organization systems 2-1 to 2-*n*, and between these systems.

The user employs the display and input device 206 (FIG. 2) of the analysis and evaluation apparatus 3 to issue an instruction to start the analysis and evaluation (S106).

In consonance with this instruction, the log collection and management unit 302 receives the message logs from the organization systems 2-1 to 2-*n*.

The user designates the evaluation range (S110).

Specifically, the user employs the display and input device 206 to indicate whether the analysis and evaluation should be performed either for the influence that the organization P to be evaluated, as defined at S100, has had on part of the organizations or for the influence the organization P has had on all the organizations, or whether the analysis should be performed either for only an organization that is influenced by the organization p or for the influence and how the influence is utilized.

FIG. 36 is a diagram showing the analysis and evaluation processing (S20) in FIG. 35 that is performed by the analysis and evaluation unit 306 (FIG. 7).

In accordance with the user's designation, as is shown in FIG. 35, the analysis and evaluation unit 306 performs the analysis and evaluation processing and stores the obtained results in the analysis and evaluation result DB 308.

The UI unit 312 displays the analysis and evaluation results obtained at S20 on the display and input device 206, or uses the storage device 208 to store the results on a recording medium 210.

As is shown in FIG. 36, at step 200 (S200), the analysis and evaluation unit 306 analyzes the communication contents of the email propagated inside an organization, and extracts the common word (attribute) for each organization, as explained while referring to FIGS. 17 and 19.

At step 202 (S202), the analysis and evaluation unit 306 analyzes the communication contents of the email propagated between organizations, and extracts the common word (attribute) from this email, as explained while referring to FIGS. 21 and 23.

At step 204 (S204), the analysis and evaluation unit 306 analyzes the communication contents of the email related to an individual, and extracts the common word (attribute) from this email, as explained while referring to FIGS. 25 and 26.

At step 206 (S206), the analysis and evaluation unit 306 compares the common word and the concept for the organization or individual to be evaluated with the common words and concepts for the other organizations.

At step 208 (S208), as explained while referring to FIGS. 27 and 30, the analysis and evaluation unit 306 evaluates the influence that the organization or individual to be evaluated has had on the other organizations.

At step 210 (S210), the analysis and evaluation unit 306 analyzes the usage level for the organization and individual to be evaluated.

At step 212 (S212), based on the usage level and the number of organizations (FIGS. 27 and 30) that are influenced by the organization or individual to be evaluated, the analysis and evaluation unit 306 evaluates and ascertains the value of the organization or individual to be evaluated.

The analysis and evaluation unit 306 can also examine the period during which the organizational communication information (FIG. 12) is present and the date and time of a communication, and can evaluate the organizational communication with in an arbitrary time range.

At step 214 (S214), the analysis and evaluation unit 306 analyzes how the influence the organization or individual to be evaluated had on others was changed as time elapsed.

At step 216 (S216), the analysis and evaluation unit 306 stores, in the analysis and evaluation result DB 308, all the analysis and evaluation results that are obtained, through this processing, for the organization or individual to be evaluated.

[Modification]

In this explanation, email and the WWW have been used as example media. However, the present invention can also be applied for other media, and an evaluation in accordance with the invention may be performed based on text data obtained by voice recognition for live speech at a meeting, or for speech propagated as a communication.

The present invention can also be used for communication using an electronic bulletin board, a chat system or an instant message.

[Specific Exmaples]

According to the present invention, for each of the organizations that are included on a mailing list as part of a voluntary community that shares the information for discussing a company product, the strength of influence can be evaluated by analyzing all communications, including emails exchanged by the organizations that are developing the product, the data of voice recording of the meetings and chatting at office desks.

Further, according to the present invention, it can be understood how the contents of free discussions on the mailing list, concerning the mission of the entire company, have influenced all the communications exchanged by the employees.

According to the present invention, even for a specific person who, while on the mailing list in a company, remains silent (a so-called lurker), the influence that the mailing list for this person has on another organization can be evaluated, so long as he or she relays to others, via email, by phone or at an interview, information personally obtained through the mailing list, transfers an email to another mailing list, or introduces at a meeting a topic provided by the mailing list.

More specifically, according to the invention, the concepts (a word, a synonym, a sentence, a semantic network and the ontology) used for a specific mailing list and the concepts used for other than the mailing list are recorded, analyzed and evaluated. Therefore, it is possible to determine whether the concepts used for the mailing list are used for other than the mailing list.

For example, assume that an active discussion concerning a "new way to use a function Y of a specific product X and its promotion to the market" is to be held on the mailing list, and the developer of the product X and a cross-section of the sales staff can participate in the discussion and express all their ideas that apply to the product X.

According to the invention, regardless of whether the mailing list participants make a statement or not, so long as this topic is brought up in a conversation other than the mailing list, this fact can be obtained as the analysis results.

Further, when an analysis is performed to obtain the frequency whereat a word (a common word) and a concept that appear frequently in the above conversation is used in emails prepared by the other organizations, it is possible to obtain an idea of how much the conversation on the mailing list has influenced and has spread to the other organizations. Therefore, based on the difference and the rate between the input and output, the evaluation method of the invention can replace the conventional method.

For example, assume that the discussion concerning a "new way to use the function Y of the specific product X and the promotion to the market" was presented by a specific sales employee as a unique proposal for a client, and thereafter another sales employee who had participated in the mailing list asked the superior of the specific sales employee for permission to use this proposal as an idea for his or her client.

According to this invention, such a conversation can be recorded, and its influence and the usage level can be evaluated to assign a value for the mailing list.

Further, assume that other sales employees who read the conversation on the mailing list have actually presented the proposal to their clients, and that these employees sent, to the mailing list, remarks to the effect that, in order to obtain their clients approval of the proposal, a function Y' must be developed by adding a new function to the function Y.

In this case, each sales employee suggests that his or her superior separately request that the development organization develop the function Y'. However, generally, it may be difficult for this additional function to be developed for only one client, and in many cases, this matter ends with the suggestion to the superior, or is included in a proposal, submitted through formal organization channels, for the updating the function, as a modification to be incorporated in the next version that is developed.

However, in this case, there is a time lag between the time whereat the function Y' is actually required and the time whereat the function Y' is actually mounted, and it is frequently impossible for an appropriate timing to be allocated for resolving this client related problem.

On the other hand, according to the present invention, the conversation with the superior, which is not carried along the organization route for the updating of the function, can be recorded, and can be evaluated as the strength of influence and the extent of influence of the mailing list.

In this evaluation process, since the opinion that the function Y' should be requested is included in a semantic network produced based on the function Y, the manager and the development and the project organizations can also quickly understand the market needs based on the recorded conversation, and can discuss the development of the function Y'.

The present invention can be used to analyze a message exchanged between organizations, and to objectively evaluate and ascertain a value for each organization.

According to the evaluation apparatus and the evaluation method of the invention, messages exchanged between organizations can be analyzed, and the values of the organizations can be objectively evaluated.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An evaluation apparatus comprising:
   a propagation information storage unit configured to store propagation information data including information messages to be electrically propagated within a plurality of groups to be evaluated; and
   an evaluation unit configured to evaluate an influence that one group, which is selected from among the plurality of groups, has on other group by analyzing the propagation information data stored in the propagation information storage unit,
   wherein the propagation information data includes content data representing content of the information to be propagated,
   wherein the propagation information storage unit stores content data representing content of the propagation information data, and
   wherein the evaluation unit, based on the content data for the information that has been stored for a group to be evaluated, extracts an attribute for the group to be evaluated, extracts a concept for content data in information that has been propagated or received by the other groups, and employs the attribute extracted for the group to be evaluated and the concept extracted for the content data to evaluate the influence of the concept that the group to be evaluated has had on the other groups.

2. The evaluation apparatus as claimed in claim 1, further comprising:
   a usage analysis unit configured to analyze, based on the attribute extracted for the group to be evaluated and the attribute extracted for the content data in information that has been propagated or received by the other groups, the extent to which the other groups have used the group to be evaluated.

3. The evaluation apparatus as claimed in claim 1, further comprising:

a change analysis unit for analyzing a change in an influence that the group to be evaluated has on the other groups.

4. The evaluation apparatus as claimed in claim 1, wherein an email is propagated as the information, wherein the propagation information data includes sender group data representing a group that has propagated the email, recipient group data representing a group that has received the email, and content data representing the content of the email, and wherein the evaluation unit extracts an attribute for the group to be evaluated by analyzing content data for an email propagated by the group to be evaluated, extracts concepts for the content data in emails that are propagated or received by the other groups, analyzes a relationship between the group to be evaluated and each of the emails based on the attribute extracted for the group to be evaluated and the concepts extracted for the content data in the emails, and employs the analysis results obtained for the relationship between the group to be evaluated and each of the emails to evaluate an influence of the concept that the group to be evaluated has on the other groups.

5. The evaluation apparatus as claimed in claim 1, wherein the groups are organizations each having one or more components.

6. The evaluation apparatus as claimed in claim 1, wherein the concept is a common word, which frequently appears in the one group.

7. An evaluation method comprising:

storing propagation information data including information messages to be electrically propagated within a plurality of groups to be evaluated; and evaluating an influence that one group, which is selected from among the plurality of groups, has on other group by analyzing the propagation information data stored, wherein the propagation information data includes content data representing content of the information to be propagated, wherein the method further comprising:

storing content data representing the content of the propagation information data;

extracting an attribute for the group to be evaluated based on the content data for the information that has been stored for the group to be evaluated;

extracting a concept for content data in information that has been propagated or received by the other groups; and evaluating the influence of the concept that the group to be evaluated has had on the other groups based on the attribute extracted for the group to be evaluated and the concept extracted for the content data.

8. The evaluation method as claimed in claim 7, further comprising:

analyzing, based on the attribute extracted for the group to be evaluated and the attribute extracted for the content data in information that has been propagated or received by the other groups, the extent to which the other groups have used the group to be evaluated.

9. The evaluation method as claimed in claim 7, further comprising:

analyzing a change in an influence that the group to be evaluated has on the other groups.

10. The evaluation method as claimed in claim 7, wherein an email is propagated as the information, wherein the propagation information data include sender group data representing a group that has propagated the email, recipient group data representing a group that has received the email, and content data representing the content of the email, and wherein the method further comprising:

analyzing the content data for an email propagated by the group to be evaluated;

extracting an attribute for the group to be evaluated;

extracting a concept for the content data in emails that are propagated or received by the other groups;

analyzing a relationship between the group to be evaluated and each of the emails, based on the attribute extracted for the group to be evaluated and the concepts extracted for the content data in the emails; and evaluating an influence of the concept that the group to be evaluated has on the other groups by the analyzed results obtained for the relationship between the group to be evaluated and each of the emails.

11. The evaluation method as claimed in claim 7, wherein the groups are organizations each having one or more components.

12. The evaluation method as claimed in claim 7, wherein the concept is a common word, which frequently appears in the one group.

13. A program for computer to evaluate activities of a plurality of groups to be evaluated, the program making the computer to perform a process comprising:

storing propagation information data including information messages to be electrically propagated within a plurality of groups to be evaluated; and evaluating an influence that one group, which is selected from among the plurality of groups, has on other group by analyzing the propagation information data stored, wherein the propagation information data includes content data representing content of the information to be propagated, wherein the program further making the computer to perform the process comprising:

storing content data representing the content of the propagation information data;

extracting an attribute for the group to be evaluated based on the content data for the information that has been stored for the group to be evaluated;

extracting a concept for content data in information that has been propagated or received by the other groups; and evaluating the influence of the concept that the group to be evaluated has had on the other groups based on the attribute extracted for the group to be evaluated and the concept extracted for the content data.

14. The program as claimed in claim 13, further making the computer to perform the process comprising:

analyzing, based on the attribute extracted for the group to be evaluated and the attribute extracted for the content data in information that has been propagated or received by the other groups, the extent to which the other groups have used the group to be evaluated.

15. The program as claimed in claim 13, further making the computer to perform the process comprising:

analyzing a change in an influence that the group to be evaluated has on the other groups.

16. The program as claimed in claim 13, wherein an email is propagated as the information,
wherein the propagation information data include sender group data representing a group that has propagated the email, recipient group data representing a group that has received the email, and content data representing the content of the email, and
wherein the program further making the computer to perform the process comprising:
analyzing the content data for an email propagated by the group to be evaluated;
extracting an attribute for the group to be evaluated;
extracting a concept for the content data in emails that are propagated or received by the other groups;
analyzing a relationship between the group to be evaluated and the email, based on the attribute extracted for the group to be evaluated and the concepts extracted for the content data in the emails; and
evaluating an influence of the concept that the group to be evaluated has on the other groups by the analyzed results obtained for the relationship between the group to be evaluated and each of the emails.

17. The program as claimed in claim 13, wherein the groups are organizations each having one or more components.

18. The program as claimed in claim 13, wherein the concept is a common word, which frequently appears in the one group.

* * * * *